US011135961B2

(12) United States Patent
Lamy et al.

(10) Patent No.: US 11,135,961 B2
(45) Date of Patent: Oct. 5, 2021

(54) ROAD TRANSPORT APPARATUS FOR HELICOPTER

(71) Applicants: Frédéric Lamy, Trois-Rivières (CA); Patrick Béard, Saint-Jean-sur-Richelieu (CA)

(72) Inventors: Frédéric Lamy, Trois-Rivières (CA); Patrick Béard, Saint-Jean-sur-Richelieu (CA)

( * ) Notice: Subject to any disclaimer, the term of this patent is extended or adjusted under 35 U.S.C. 154(b) by 170 days.

(21) Appl. No.: 16/387,493

(22) Filed: Apr. 17, 2019

(65) Prior Publication Data

US 2019/0322206 A1    Oct. 24, 2019

Related U.S. Application Data

(60) Provisional application No. 62/659,324, filed on Apr. 18, 2018.

(51) Int. Cl.
  *B60P 3/11*   (2006.01)
  *B60P 7/08*   (2006.01)
  *B64F 5/50*   (2017.01)
  *B62D 63/06*  (2006.01)

(52) U.S. Cl.
  CPC .............. *B60P 3/11* (2013.01); *B60P 7/0892* (2013.01); *B64F 5/50* (2017.01); *B62D 63/068* (2013.01)

(58) Field of Classification Search
  CPC .... B60P 3/36; B60P 3/423; B60P 3/14; B60P 1/00; B60P 1/26; B60P 3/32; B60P 3/40; B60P 3/00; B60P 7/0815

USPC ............ 296/182.1, 186.1, 183.1, 168, 24.31, 296/181.5, 76, 71, 70, 65.05; 280/441.2, 280/783, 789, 124.101, 748, 656, 63; 438/131, 137, 138, 156, 688, 523
See application file for complete search history.

(56) References Cited

U.S. PATENT DOCUMENTS

| | | | | | |
|---|---|---|---|---|---|
| 3,353,862 | A | * | 11/1967 | Tormolen | B60P 3/11 410/2 |
| 4,171,114 | A | * | 10/1979 | Marden | B60P 3/11 114/261 |
| 4,878,800 | A | * | 11/1989 | Dell | B65G 69/30 414/401 |
| 5,026,243 | A | * | 6/1991 | Dell | B65G 69/30 14/71.1 |
| 5,102,503 | A | * | 4/1992 | Silinski | C02F 1/048 202/83 |
| 5,769,478 | A | * | 6/1998 | Vernese | B60P 3/04 296/181.6 |
| 2011/0079166 | A1 | * | 4/2011 | Popa-Simil | B60K 16/00 105/1.4 |
| 2018/0001812 | A1 | * | 1/2018 | Friemel | B62D 63/08 |

* cited by examiner

*Primary Examiner* — D Glenn Dayoan
*Assistant Examiner* — Sunsurraye Westbrook
(74) *Attorney, Agent, or Firm* — Benoit & Cote Inc.; Mathieu Audet

(57) ABSTRACT

An apparatus for transporting a helicopter by ground transportation is hereby presented, the apparatus comprising a mechanism pulling on the rotor assembly to alleviate at least a portion of a mass of the blades to prevent mechanical compression to be applied on a rotor of the helicopter when the helicopter is transported with the apparatus. A trailer thereof, an operation command center, a helicopter crate and a method of use thereof are also presented therein.

20 Claims, 33 Drawing Sheets

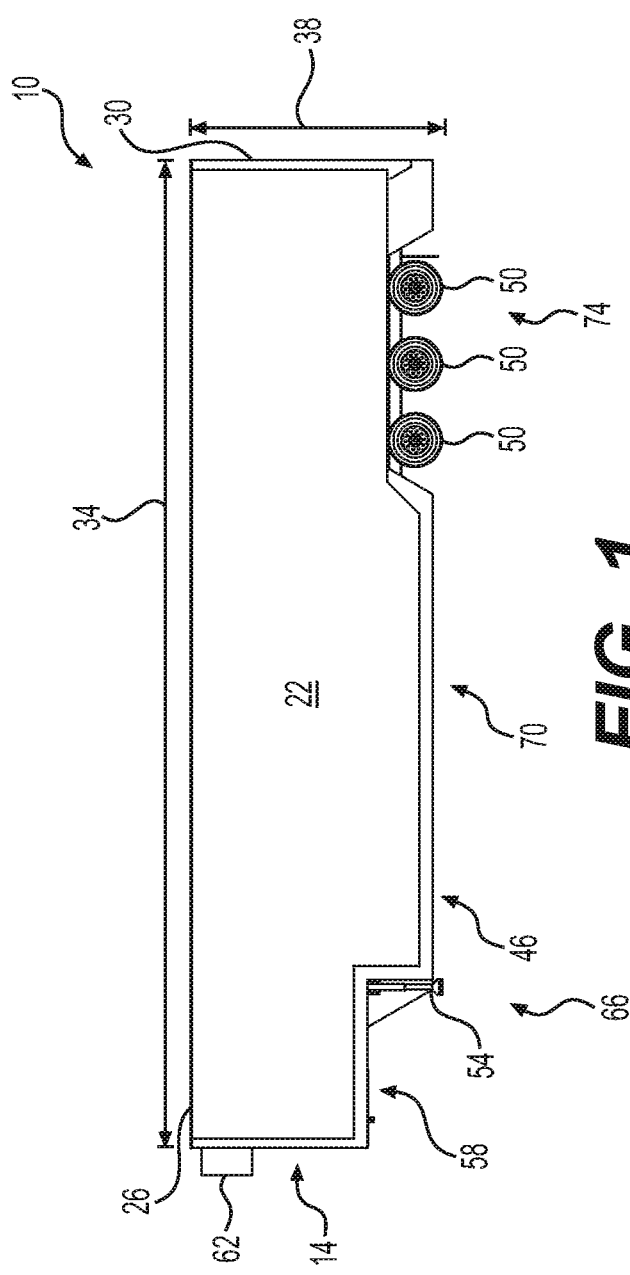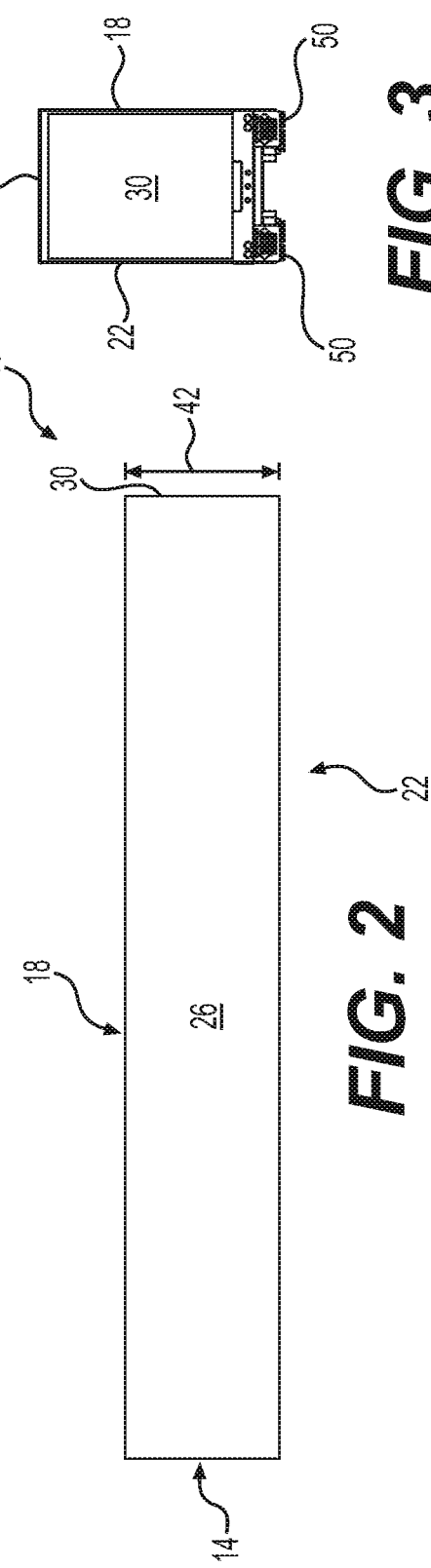

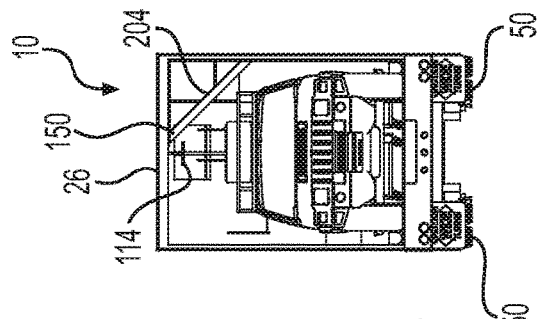
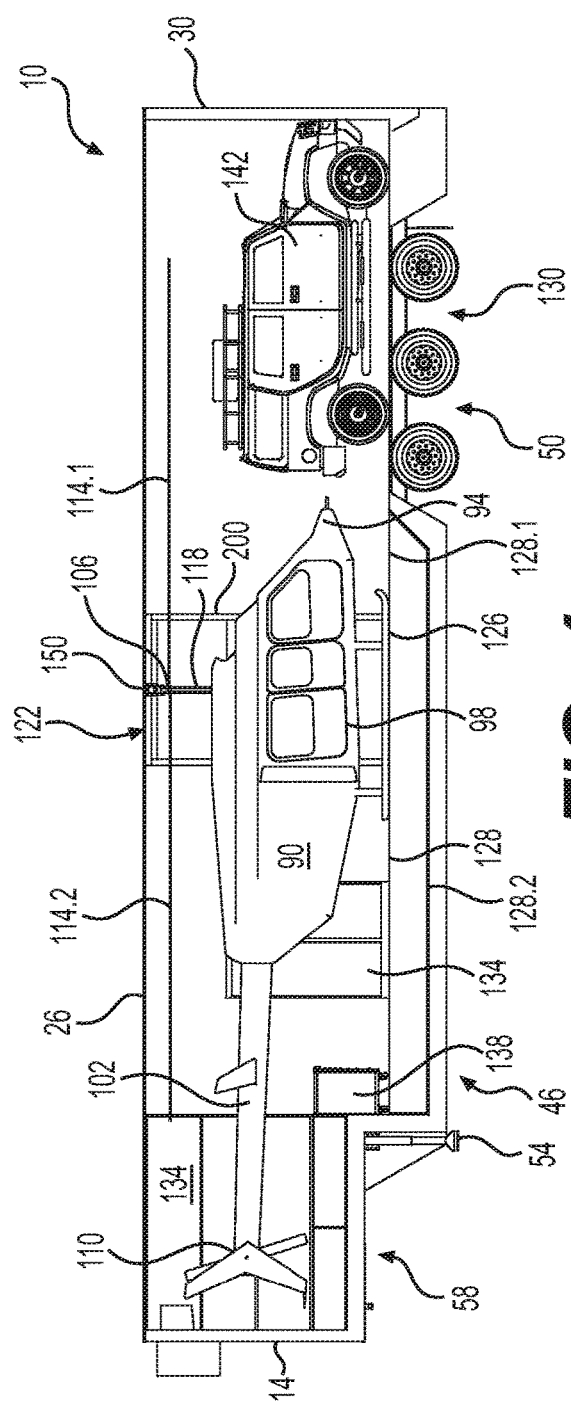
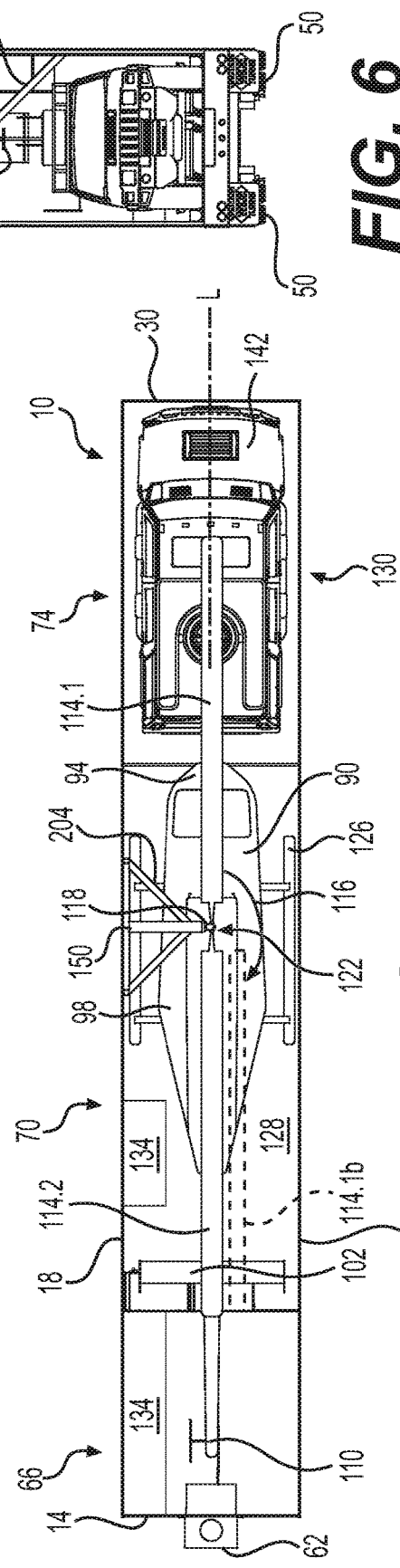

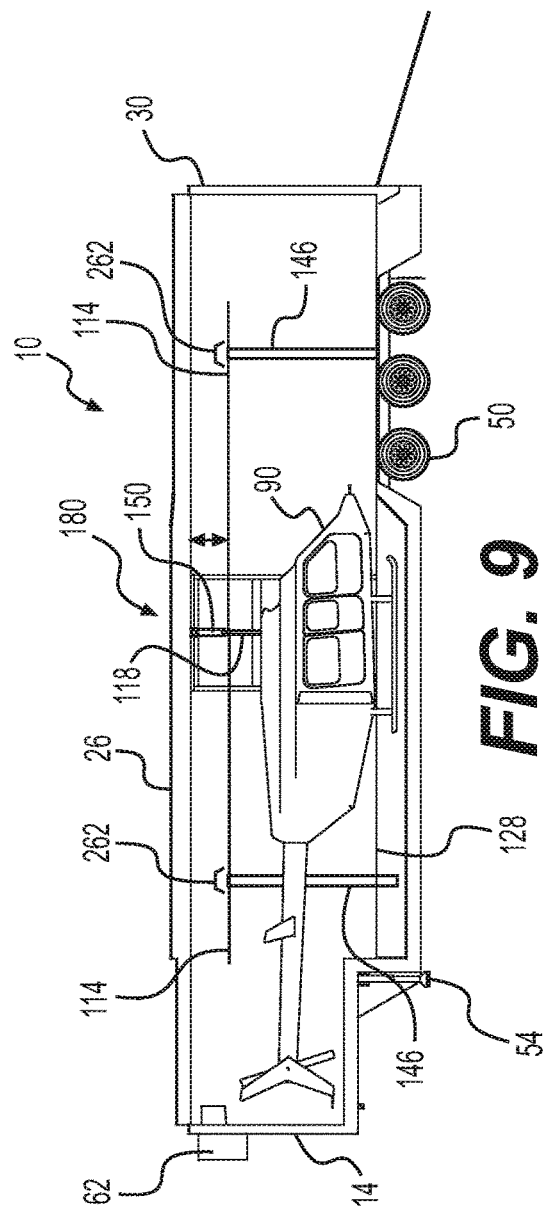
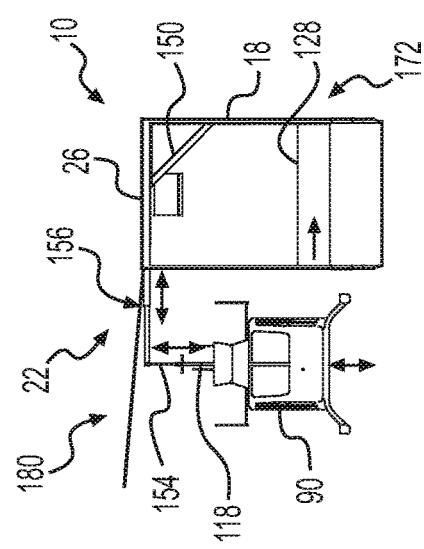

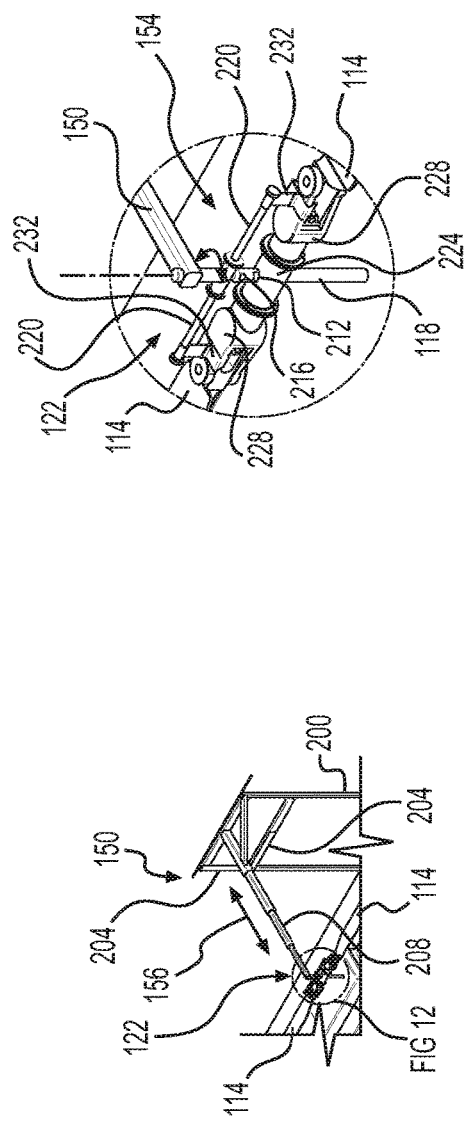
FIG. 11
FIG. 12
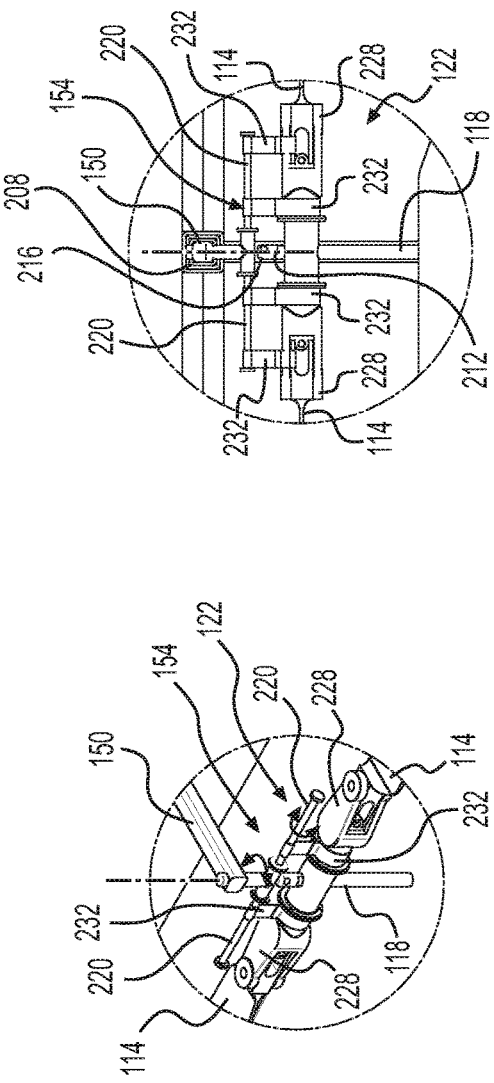
FIG. 15
FIG. 14
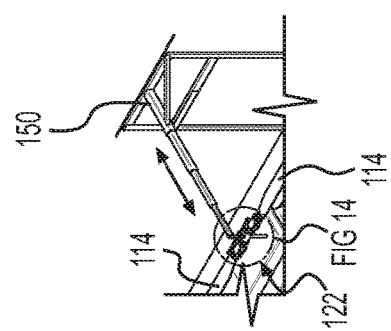
FIG. 13

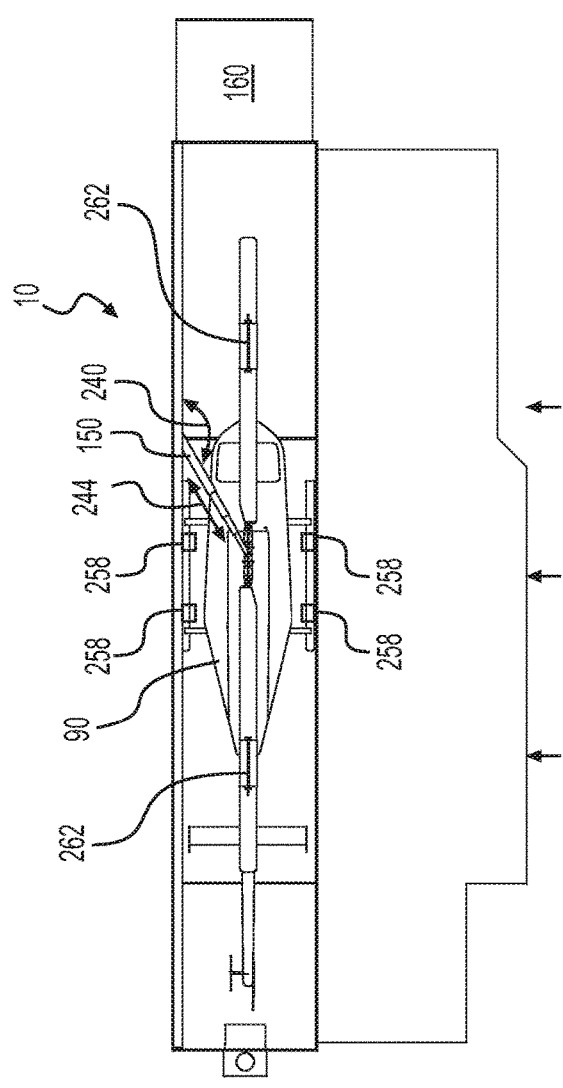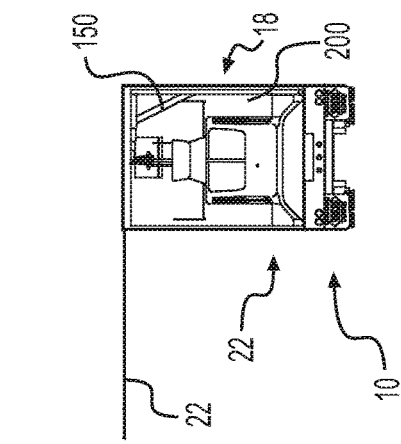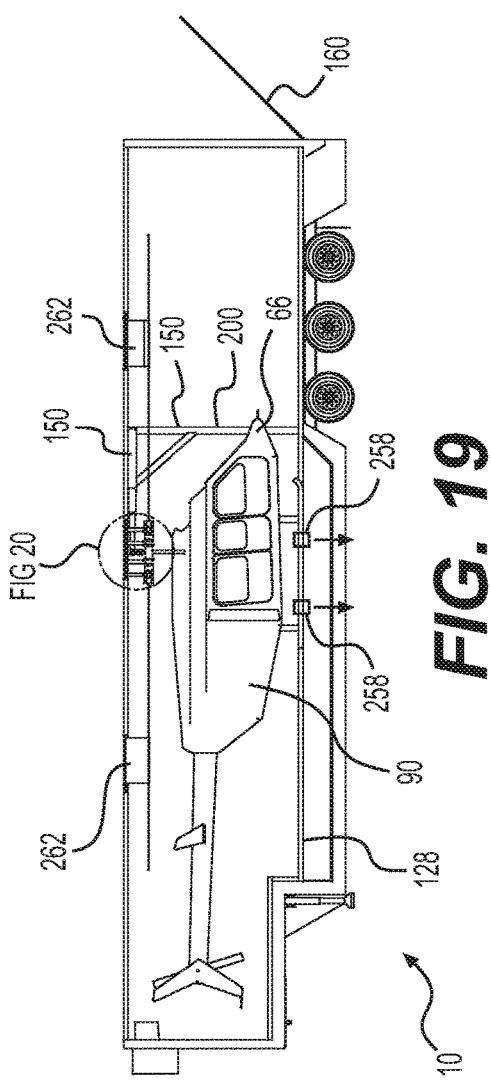

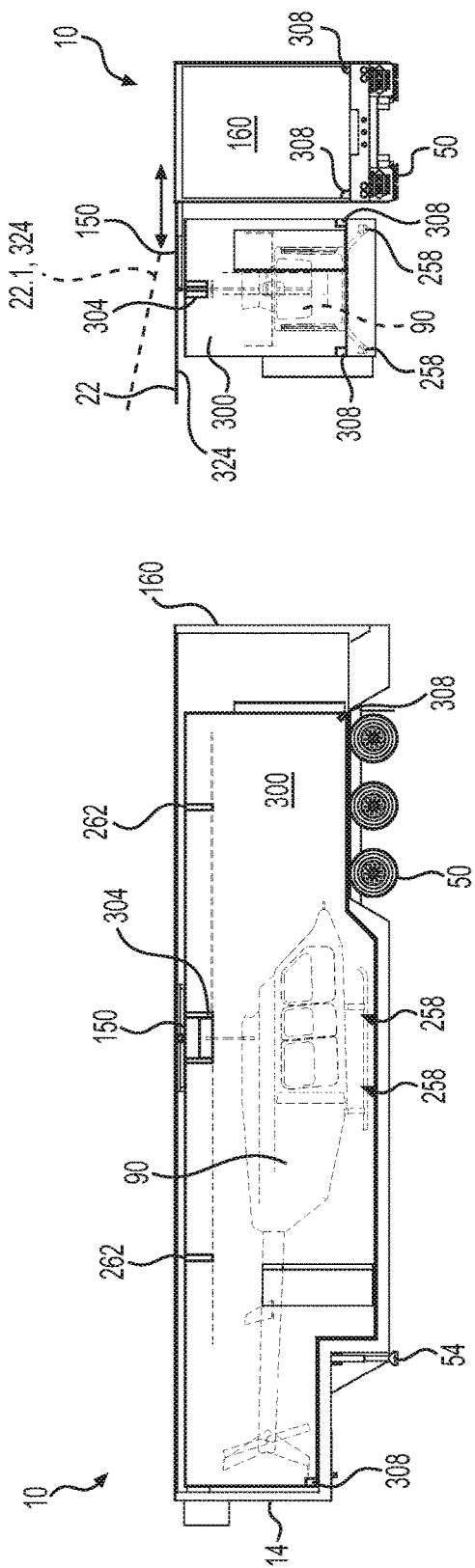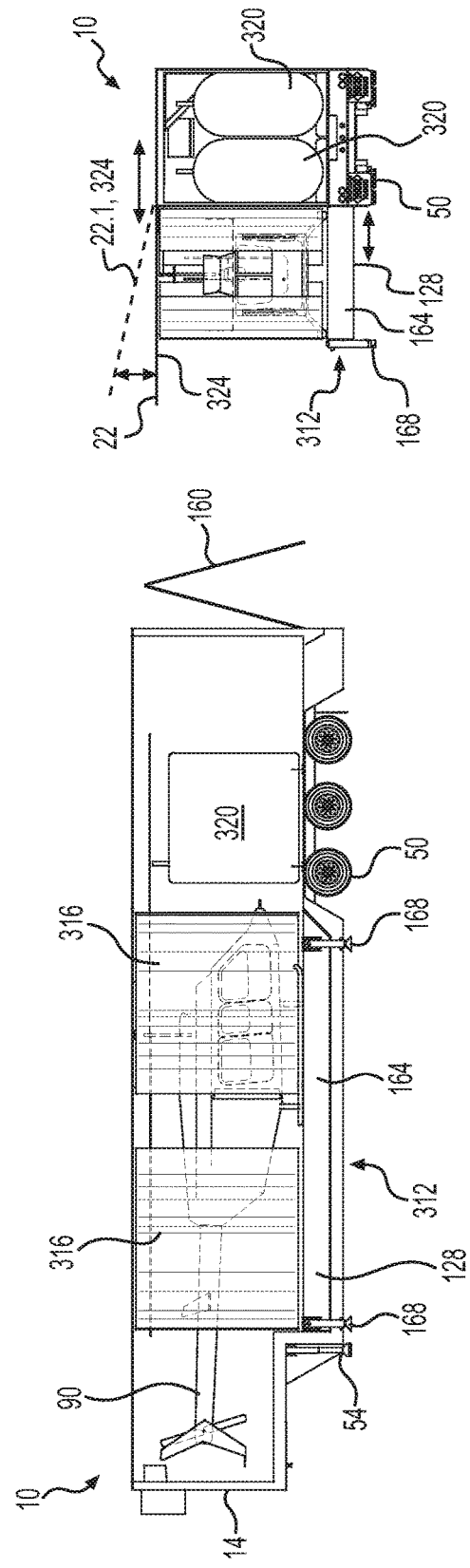

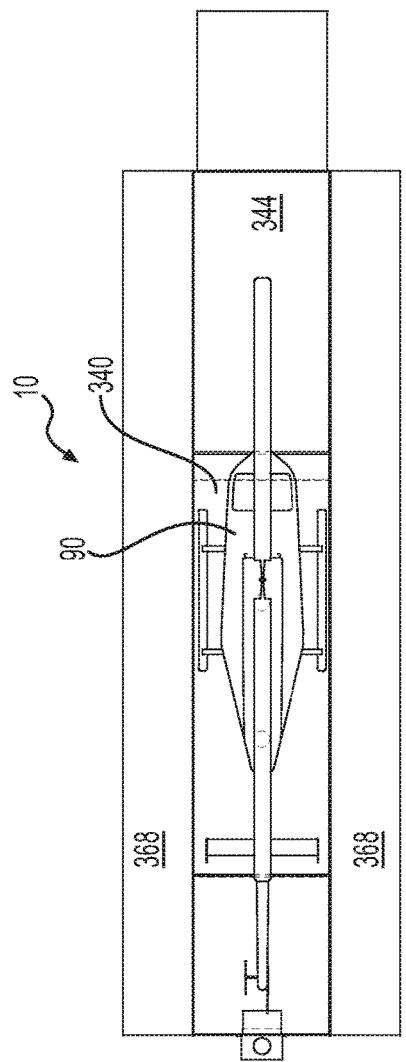
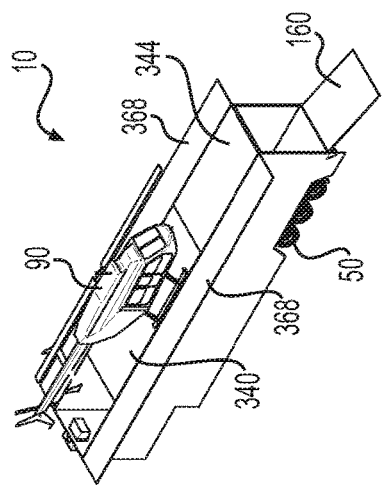
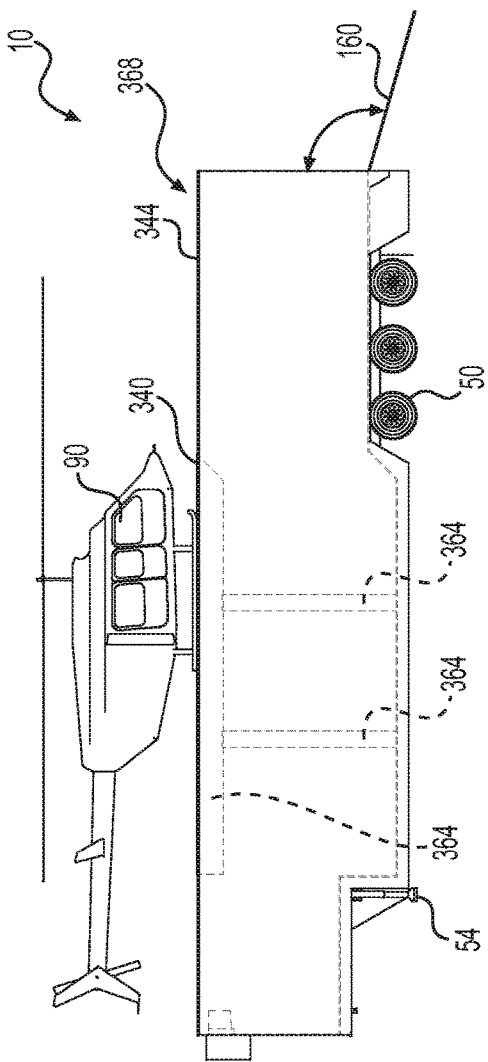
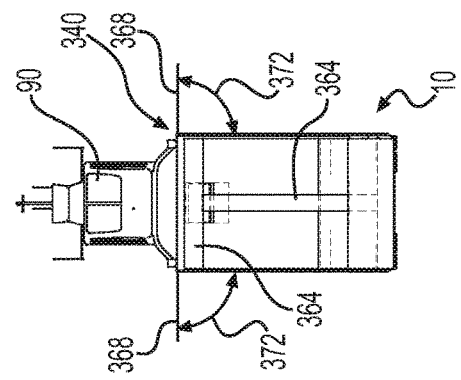

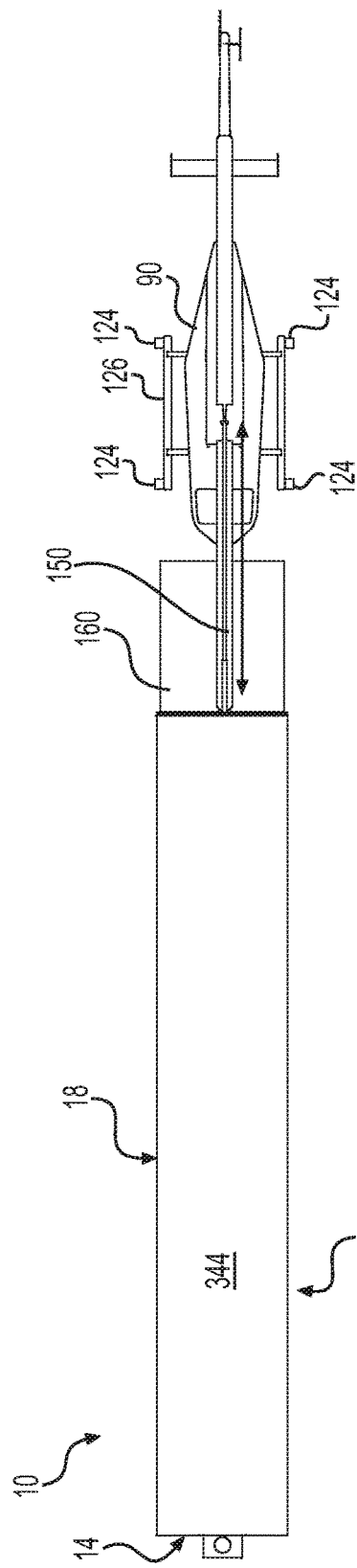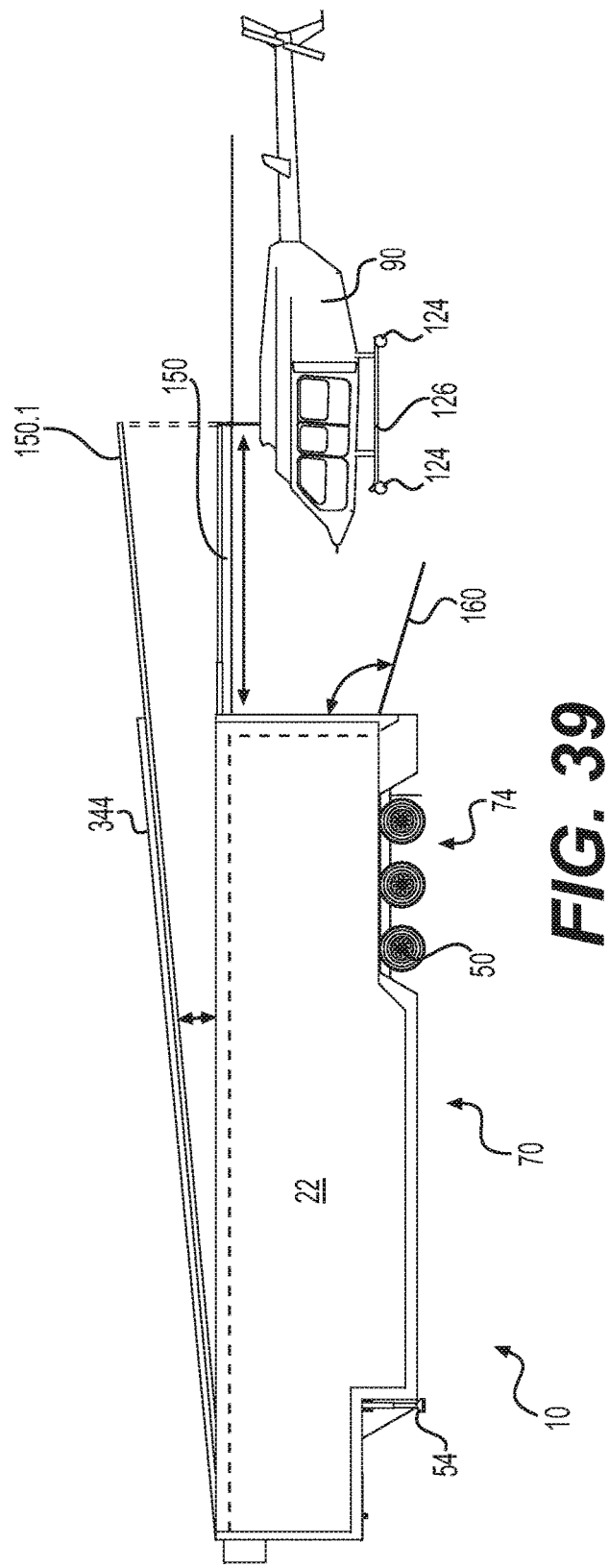
FIG. 38
FIG. 39

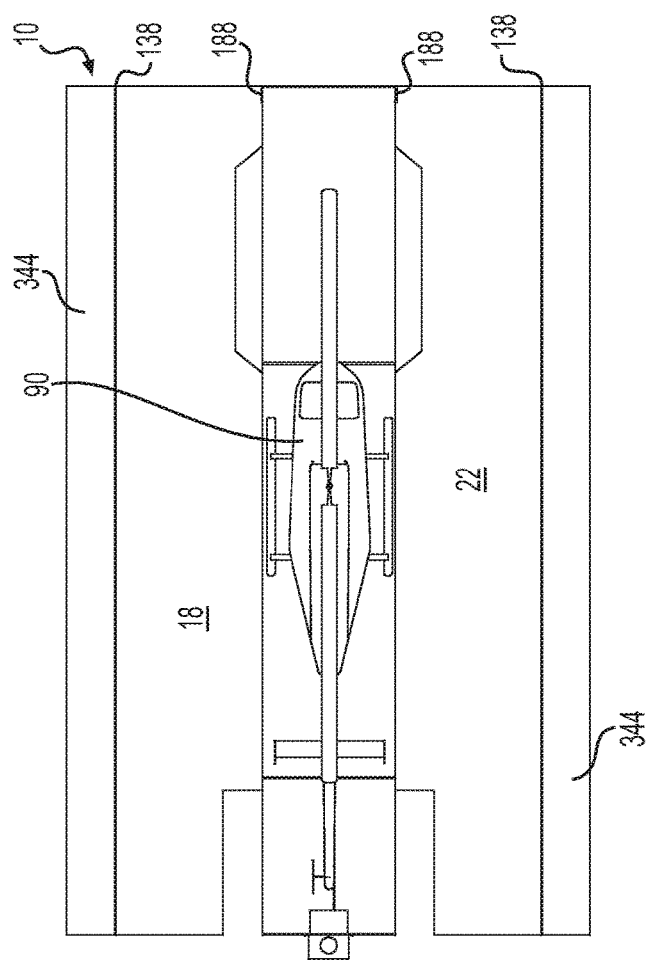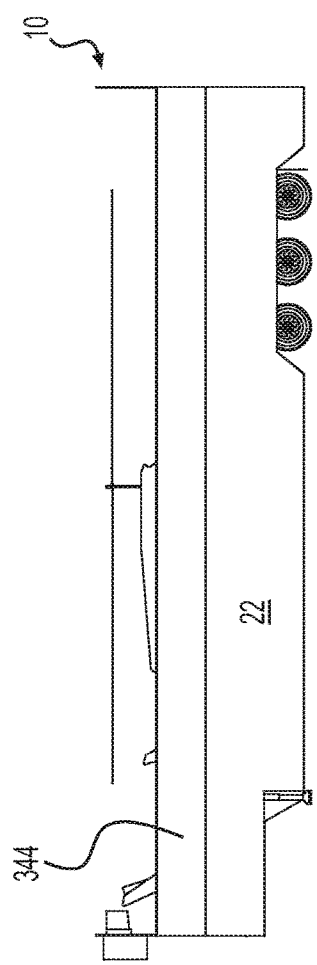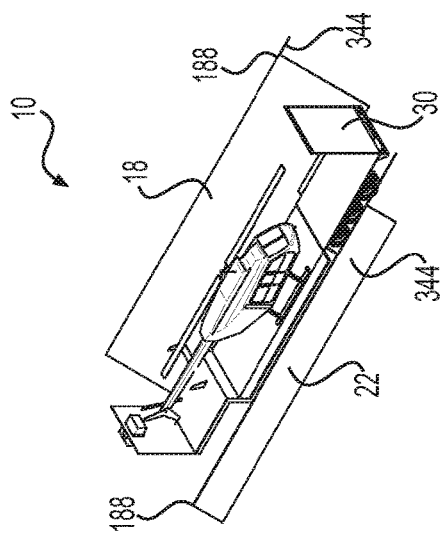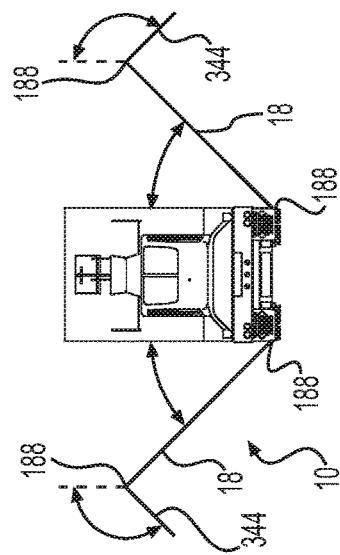

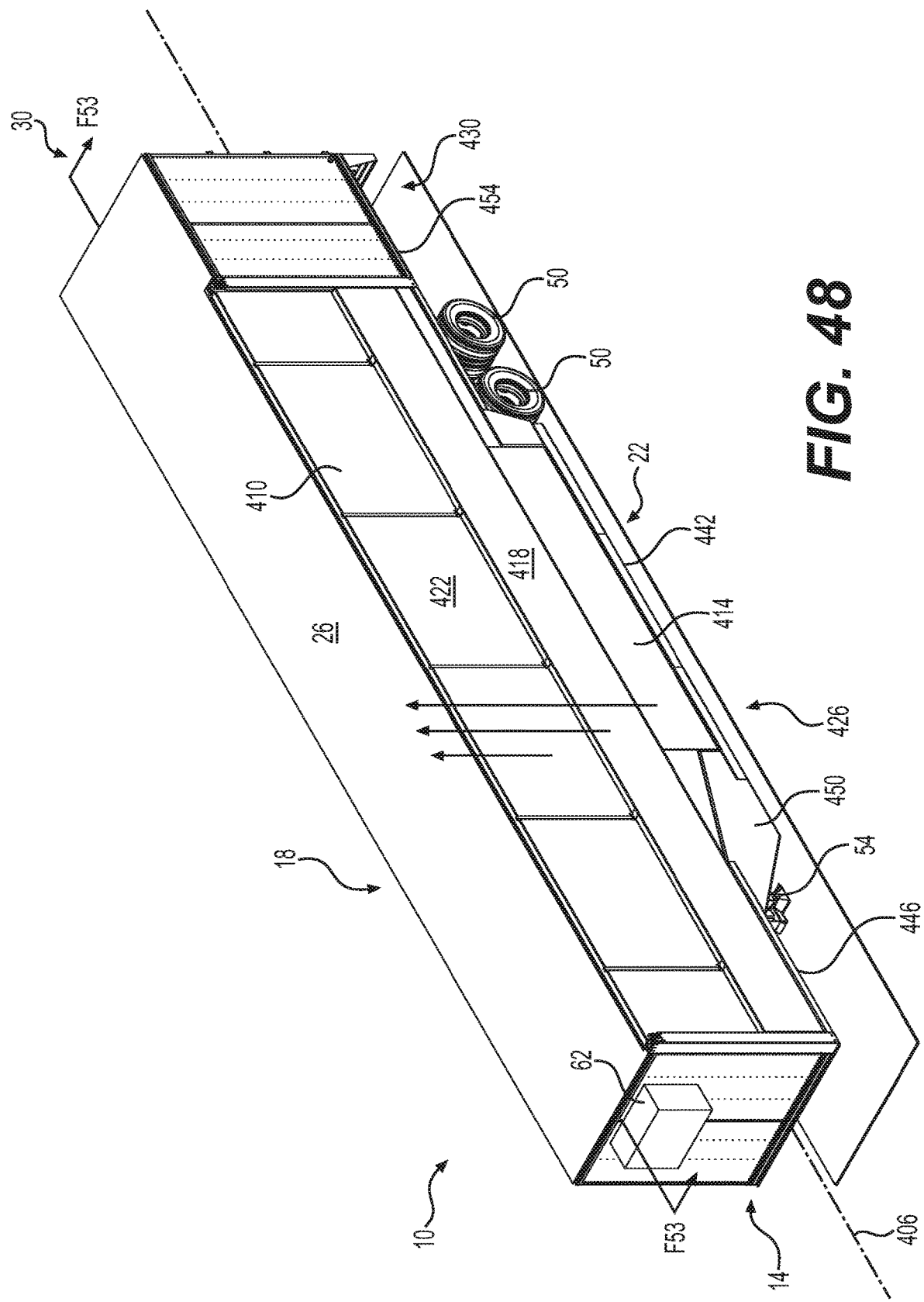

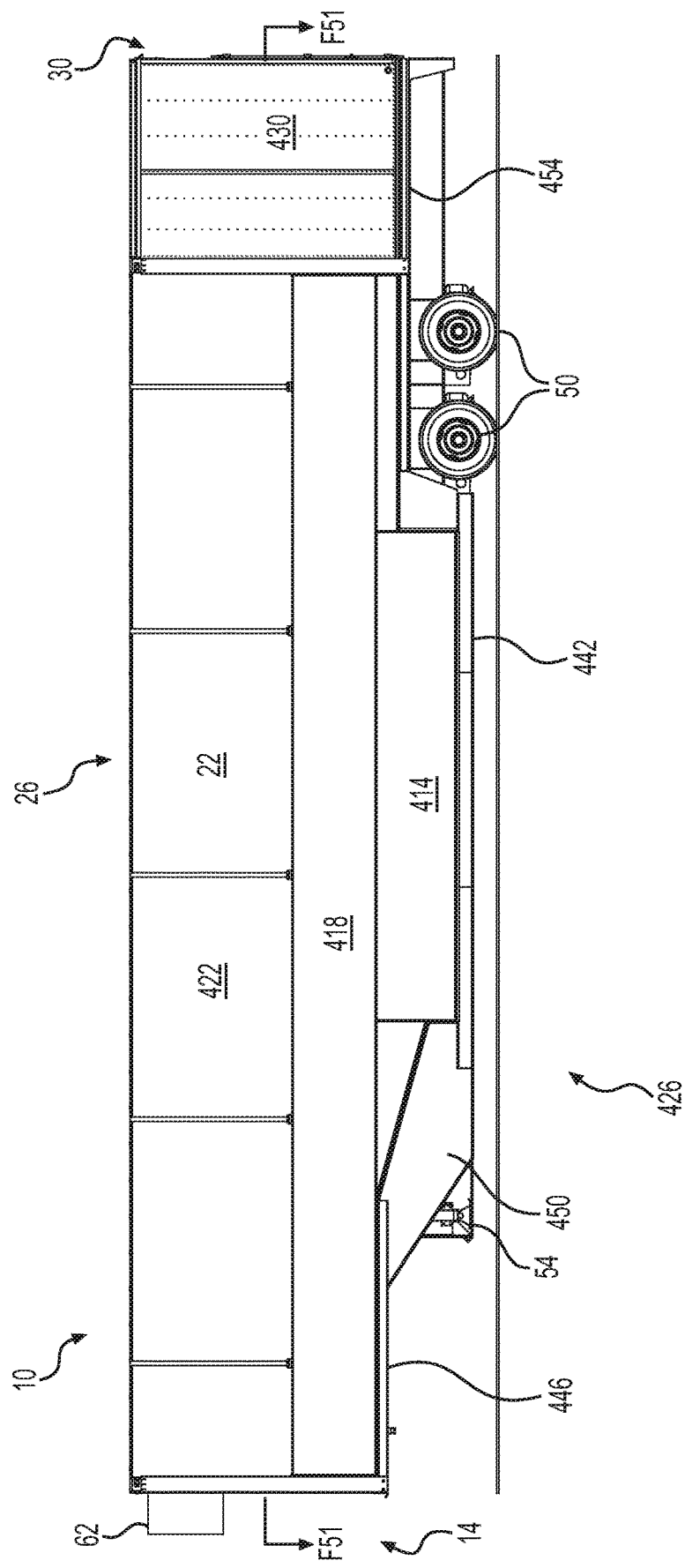

ROAD TRANSPORT APPARATUS FOR HELICOPTER

CROSS-REFERENCE

The present application is a nonprovisional patent application of, and claims priority under 35 U.S.C. 119(e) to, U.S. provisional patent application No. 62/659,324, filed Apr. 18, 2018, which is incorporated herein by reference.

TECHNICAL FIELD

The present invention relates to a transport system and maintenance facility for helicopters.

BACKGROUND

Helicopters are commonly used to transport people and goods. Physical and technical capabilities of helicopters make them quite unique in the tasks they can perform. However, costs of operation and maintenance make them expensive to operate.

For instance, a helicopter that is operated near its base airport is going to have very little commute flight time to get to the operation location where actual work flight time is performed. In contrast, a helicopter that has an operation location at, for example a 300 km distance from its base airport, is going to have significant commute flight time to reach the operation location and commute flight time will be added to the actual work flight time and other operation costs. In the later situation, the two 300 km commute flights will generate flight time that is going to substantially increase the overall operation cost of the helicopter. Maintenance cost and time-sensitive parts replacement produced by the commute flights will also be added to the overall operation cost of the helicopter. However only the actual work time of the helicopter is directly benefiting the work that needs to be done.

A significant portion of the helicopter operation cost is thus not commanded by the actual work flight time when substantial commute flight time is required. This is detrimental to the use of helicopters because the commute-related expenses can rapidly become significant while not really adding value to the work-related operations. The environmental cost is also significant with the fuel consumption required for the helicopter commutes flights.

Moreover, helicopter maintenance might need to be performed at the operation location. This requires specialized equipment and mechanics to be moved to the operation location with fuel, tools and other mandatory equipment. That creates further logistic issues in addition to increase the overall charges of the work-related operations.

Maintenance and flight installations at remote operation locations can rapidly be less than ideal. The operation location can be improper to land the helicopter, perform refueling with required equipment and perform other maintenance tasks. For instance, it might be difficult to land the aircraft in the middle of a forest, the land might be wet and unable to set maintenance equipment, or the weather can simply be so cold that some housing is required.

Accordingly, there is a need for an improved apparatus for reducing the operation cost of a helicopter over the existing art. There is also a need to reduce commute flight time to bring a helicopter at an operation location. A need has also been felt for easing the maintenance and provide optimal work conditions at an operation location. A further need has been felt for an apparatus and a method thereof that can be easily used and economically manufactured to reduce the operation cost involved in helicopter operations.

BRIEF SUMMARY

It is one aspect of the present invention to alleviate one or more of the drawbacks of the background art by addressing one or more of the existing needs in the art. Accordingly, embodiments of this invention provide an improved helicopter transport system over the existing art.

The present invention, in accordance with at least one embodiment thereof, provides a trailer adapted to receive therein a helicopter in condition ready for flight with blades attached to the rotor.

The present invention, in accordance with at least one embodiment thereof, provides a helicopter crate adapted to receive therein a helicopter in condition ready for flight with blades attached to the rotor.

The present invention, in accordance with at least one embodiment thereof, provides a trailer adapted to carry on the road a helicopter with blades attached to the rotor, the trailer including a helicopter flight operation center therein.

The present invention, in accordance with at least one embodiment thereof, provides a trailer adapted to receive therein a helicopter with maintenance material and a modular space for accommodating various other needs like, for instance, a refueling station or an office.

The present invention, in accordance with at least one embodiment thereof, provides a helicopter transport apparatus that allows ground transportation of a helicopter while preventing compression of the helicopter's rotor mast during transportation.

The present invention, in accordance with at least one embodiment thereof, provides a helicopter transport apparatus that allows ground transportation of a helicopter to prevent angular movements of the helicopter's rotor mast during transportation.

The present invention, in accordance with at least one embodiment thereof, provides a trailer equipped with a helicopter suspension structure adapted to lift a helicopter in the trailer.

The present invention, in accordance with at least one embodiment thereof, provides a mechanism to prevent compression stress on a rotor mast of a helicopter during ground transportation with a wheeled vehicle.

The present invention, in accordance with at least one embodiment thereof, provides a mechanism securing a portion of the rotor mast to prevent compression stress and/or angular motions of a main rotor of a helicopter during ground transportation thereof.

The present invention, in accordance with at least one embodiment thereof, provides a mechanism to connect a Jesus nut, secured on a rotor mast of a helicopter, to at least partially suspend a weight of the helicopter to prevent compression stress to be applied on the rotor mast of the helicopter during ground transportation thereof.

The present invention, in accordance with at least one embodiment thereof, provides a mechanism to connect grips of rotor head, secured on a rotor mast of a helicopter, to at least partially suspend a weight of the helicopter to prevent compression stress to be applied on the rotor mast of the helicopter during road transportation thereof.

The present invention, in accordance with at least one embodiment thereof, provides a trailer sized and designed to receive therein a helicopter of which a rotor and blades thereof remain assembled on the helicopter in their operating configuration for ground transportation and a support structure for preventing transmission of blade's mass to the rotor mast of the helicopter during ground transportation.

The present invention, in accordance with at least one embodiment thereof, provides a trailer equipped with a helicopter lifting device for lifting a helicopter from the ground onto a platform extending from the trailer and then moving the helicopter in the trailer. The lifting device being usable to apply a tension on a rotor mast of the helicopter when traveling on the road with the trailer.

The present invention, in accordance with at least one embodiment thereof, provides a trailer sized and designed to receive therein a helicopter ready for flight, the trailer being further configured to include a modular space adapted to accommodate one or more removable modules.

The present invention, in accordance with at least one embodiment thereof, provides a helicopter crate sized and designed to contain and removably accommodate a helicopter therein and adapted to be transported by a wheeled vehicle.

The present invention, in accordance with at least one embodiment thereof, provides a helicopter crate including a helicopter support mechanism for supporting the helicopter in a fashion preventing undue compression stress on the rotor mast and the transmission thereof.

The present invention, in accordance with at least one embodiment thereof, provides a trailer equipped with a helipad for receiving and supporting a helicopter thereon and adapted to be transported by a wheeled vehicle.

The present invention, in accordance with at least one embodiment thereof, provides a trailer including a laterally extendable floor for supporting a helicopter thereon.

Other embodiments and further scope of applicability of the present invention will become apparent from the detailed description given hereinafter. However, it should be understood the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

These and other features of that described herein will become more apparent from the following description in which reference is made to the appended drawings herein:

FIG. 1 is illustrating, in accordance with at least one embodiment of the invention, a left elevation view of a trailer;

FIG. 2 is illustrating, in accordance with at least one embodiment of the invention, a top plan view of the trailer of FIG. 1;

FIG. 3 is illustrating, in accordance with at least one embodiment of the invention, a rear elevation view of the trailer of FIG. 1;

FIG. 4 is illustrating, in accordance with at least one embodiment of the invention, a left elevation view of an interior layout of a trailer;

FIG. 5 is illustrating, in accordance with at least one embodiment of the invention, a top plan view of an interior layout of the trailer of FIG. 1;

FIG. 6 is illustrating, in accordance with at least one embodiment of the invention, a rear elevation view of an interior layout of the trailer of FIG. 1;

FIG. 9 is illustrating, in accordance with at least one embodiment of the invention, a left elevation side view of an interior layout of a trailer;

FIG. 10 is illustrating, in accordance with at least one embodiment of the invention, a rear elevation view of a trailer with a helicopter suspended therefrom;

FIG. 11 is illustrating, in accordance with at least one embodiment of the invention, a partial isometric view of a portion of a rotor with a rotor suspension mechanism;

FIG. 12 is illustrating, in accordance with at least one embodiment of the invention, a partial isometric view of a portion of a rotor with a rotor suspension mechanism;

FIG. 13 is illustrating, in accordance with at least one embodiment of the invention, a partial isometric view of a portion of a rotor with a rotor suspension mechanism;

FIG. 14 is illustrating, in accordance with at least one embodiment of the invention, a partial isometric view of a portion of a rotor with a rotor suspension mechanism;

FIG. 15 is illustrating, in accordance with at least one embodiment of the invention, a partial isometric view of a portion of a rotor with a rotor suspension mechanism;

FIG. 18 is illustrating, in accordance with at least one embodiment of the invention, a top plan view of a trailer with a helicopter therein;

FIG. 19 is illustrating, in accordance with at least one embodiment of the invention, a left elevation view of a trailer with a helicopter therein;

FIG. 20 is illustrating, in accordance with at least one embodiment of the invention, a partial side elevation view of a portion of a rotor with a rotor suspension mechanism;

FIG. 21 is illustrating, in accordance with at least one embodiment of the invention, a rear elevation view of a trailer with a helicopter therein;

FIG. 26 is illustrating, in accordance with at least one embodiment of the invention, a left elevation view of a trailer with a helicopter therein and a mechanism supporting the blades of the helicopter;

FIG. 27 is illustrating, in accordance with at least one embodiment of the invention, a rear elevation view of a trailer with a helicopter suspended thereof;

FIG. 28 is illustrating, in accordance with at least one embodiment of the invention, a left elevation view of a trailer with a helicopter suspended thereof;

FIG. 29 is illustrating, in accordance with at least one embodiment of the invention, a rear elevation view of a trailer with a helicopter suspended thereof;

FIG. 34 is illustrating, in accordance with at least one embodiment of the invention, a top plan view of a trailer with a helicopter thereon;

FIG. 35 is illustrating, in accordance with at least one embodiment of the invention, a left elevation view of a trailer with a helicopter thereon;

FIG. 36 is illustrating, in accordance with at least one embodiment of the invention, an isometric view of a trailer with a helicopter thereon;

FIG. 37 is illustrating, in accordance with at least one embodiment of the invention, a rear elevation view of a trailer with a helicopter thereon;

FIG. 38 is illustrating, in accordance with at least one embodiment of the invention, a top plan view of a trailer with a helicopter suspended thereto;

FIG. 39 is illustrating, in accordance with at least one embodiment of the invention, a left elevation view of a trailer with a helicopter suspended thereto;

FIG. 44 is illustrating, in accordance with at least one embodiment of the invention, a top plan view of a trailer with a helicopter therein;

FIG. 45 is illustrating, in accordance with at least one embodiment of the invention, a left elevation view of a trailer with a helicopter therein;

FIG. 46 is illustrating, in accordance with at least one embodiment of the invention, an isometric view of a trailer with a helicopter therein;

FIG. 47 is illustrating, in accordance with at least one embodiment of the invention, a rear elevation view of a trailer with a helicopter therein;

FIG. 48 is illustrating, in accordance with at least one embodiment of the invention, a front right perspective view of a trailer for transporting a helicopter therein;

FIG. 49 is illustrating, in accordance with at least one embodiment of the invention, a left side elevation view of a trailer for transporting a helicopter therein;

DETAILED DESCRIPTION

Figure 7:
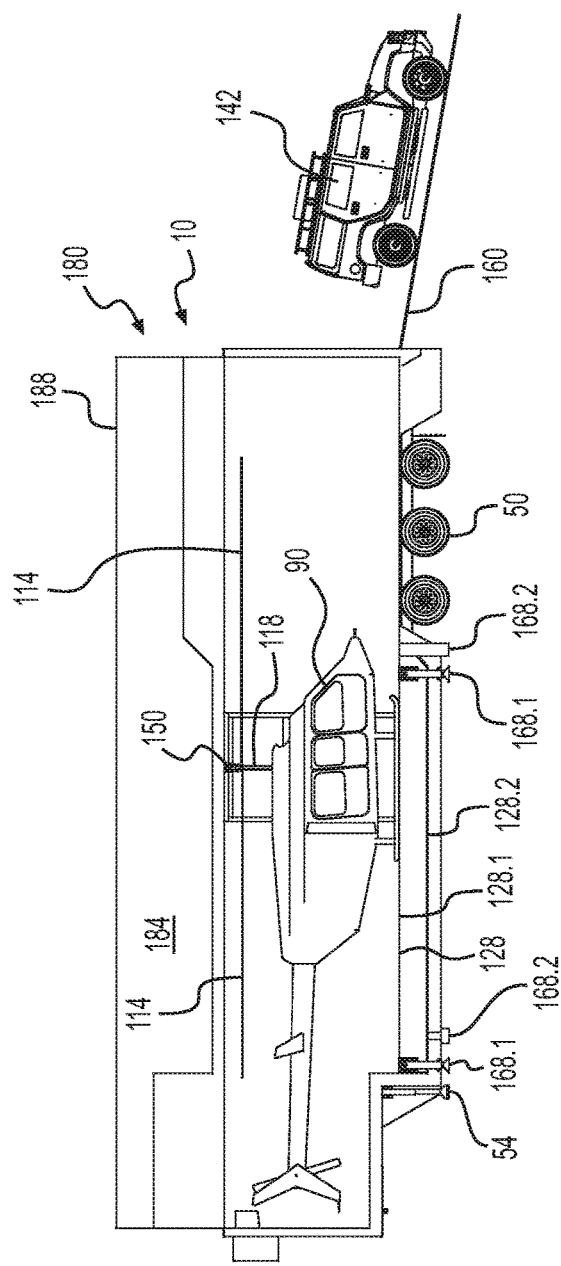
FIG. 7 is illustrating, in accordance with at least one embodiment of the invention, a left elevation side view of an interior layout of a trailer.

Preferred embodiments of the present invention are described below with reference to the drawings. The invention can be implemented in numerous ways, including as an apparatus and a kit thereof. In this specification, these implementations, or any other form that the invention may take, may be referred to as embodiments and techniques. A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A trailer 10 is illustrated in FIG. 1 throughout FIG. 3. The trailer 10 includes a front portion 14, a right portion 18, a left portion 22, a top portion 26 and a back portion 30 thereof. FIG. 1 shows a side elevation view of the trailer 10 with a standard length 34 of about 1615 cm (53 feet) and a standard height 38 of about 411 cm (13.5 feet). FIG. 2 illustrates a top plan view where a width 42 of the trailer 10 is illustratively of a standard 259 cm (102 inches). The trailer 10 is provided with a low floor configuration 46 allowing more headroom inside the trailer 10. Other trailer 10 floor configurations configured to receive a helicopter 90 thereon could be foreseen by a skilled reader without departing from the scope of the invention. The illustrated trailer 10 is designed to provide substantial interior volume for the overall standard trailer 10 exterior dimensions. The exemplified trailer 10 is further equipped with sets of wheels 50, a pair of supports 54, a front raised portion 58 and an air conditioning unit 62. Three sections can be defined in the trailer 10, a front section 66, a central section 70 and a rear section 74 thereof.

FIG. 4 throughout FIG. 6 are showing an embodiment of the trailer 10 interior organization. A helicopter 90, more precisely a Bell 206 is used for illustrative purpose, is illustrated secured in the trailer 10 in a transport configuration. However, other types of helicopters 90, like a Bell 407 or an Astar flex, inter alia, cols alternatively be used in the present situation. The helicopter 90 includes a front portion 94, a central portion 98, a tail portion 102, a top rotor portion 106 and a rear rotor portion 110. The illustrated helicopter 90 includes two collinear rotor blades 114.1, 114.2 interconnected to a main rotor shaft 118 in a main rotor assembly 122. The collinear rotor blades 114.1, 114.2 are positioned in a longitudinal direction in the trailer 10 to fit in the trailer 10 without requiring any mechanical modifications. The blades 114 can alternatively be semi-disassembled 116 and be brought in a same direction next to one another 114.1 on the rear portion or the front portion (not illustrated in FIG. 5) of the helicopter 90. The helicopter 90 is facing rearward in the trailer 10 to locate the tail portion 102 of the helicopter 90 in the front section 66 of the trailer 10. This is a preferred transport configuration layout in the trailer 10 since the tail portion 102 of the helicopter 90 is elevated and can fit in the front section 66 of the trailer 10 that is higher than the remaining portion of the trailer 10. The cockpit portion 98 includes landing skids 126 (or skates) contacting an internal floor 128 of the trailer 10. The internal floor 128 can be fixed, as embodied in FIG. 4 throughout FIG. 6. In contrast, the internal floor 128 can be laterally extendable 164, as embodied in FIG. 8, to provide additional functionalities like moving the helicopter 90 out of the trailer 10 or provide an outside work area. The helicopter 90 can be supported on the internal floor 128 at a high position 128.1 or at a low position 128.2 depending how much headroom is required for transporting a specific type of helicopter 90. Still in FIG. 6, the rear section 74 of the trailer 10 is adapted to receive cargo therein. Hence, a cargo space 130 is generally located over the sets of wheels 50 of the trailer 10. In the present situation, a vehicle 142 is illustratively located in the cargo space 130 although the cargo space 130 can receive therein other cargo types and configurations thereof. Cabinets 134 are optionally installed in the trailer 10 where there is reasonable space to carry and store tools and replacement parts, inter alia. A movable bin 138 is also illustrated in FIG. 4 and FIG. 5.

A helicopter rotor suspension mechanism 150 is located in the trailer 10 to facilitate moving the helicopter 90 in and out of the trailer 10. The rotor suspension mechanism 150 can also be used to provide a vertical tension on the rotor/main transmission of the helicopter 90. A different mechanism can be used to apply tension on the rotor of the helicopter 90 and to move the helicopter in and out of the trailer 10. Indeed, helicopters 90 are designed to have their weight suspended by the main rotor 118 when in flight, hence the weight of the blades 114 is not axially compressing the main rotor 118 in normal operation. The weight of the blades 114 is however applying compression stress on the main rotor 118 when the helicopter is not in flight. This is a generally acceptable condition when the helicopter 90 is at rest. However, the main rotor 118 and its components (Flybar paddle, anti-rotation bracket, swashplates, mast, yoke, rotor hub . . . ) is not designed to sustain significant or repetitive compression stresses caused by the weight of the blades 114 on the main rotor 118 during road transportation of the helicopter 90. The weight of the blades 114 can damage the main rotor assembly 122 and/or the main transmission of the helicopter 90. The rotor suspension mechanism 150 of the present invention is used to connect and suspend the main rotor assembly 122 to the trailer 10 during transportation to bear a portion of, or all the weight of the blades 114 to prevent applying a detrimental level of compression stress to the main rotor shaft 118 and on the main transmission of the helicopter 90 that is exceeding the level of stress provided by the blades 114 when the helicopter 90 is at rest. As it will be described in further details below, the rotor suspension mechanism 150 can be connected to the helicopter 10 directly or indirectly to the main rotor assembly 122 in various fashions. It will be also described in further details that the rotor suspension mechanism 150 can be fixed, angularly adjustable, extendable, and the like. The rotor suspension mechanism 150 is embodied with a trailer wall-connecting portion 200 with angled braces 204 for providing sufficient mechanical strength for lifting and moving the helicopter 90 in and out of the trailer 10. One can appreciate the helicopter 90 is generally axially centered in the trailer 10 when properly located in the trailer 10 for transportation.

Figure 8:
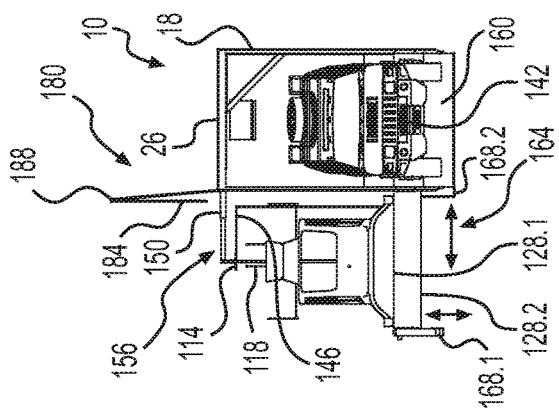
FIG. 8 is illustrating, in accordance with at least one embodiment of the invention, a rear elevation view of an interior layout of a trailer with a helicopter supported by an extendable floor portion.

Moving now to FIG. 7 and FIG. 8 depicting a rear door 160 that can be used as a ramp for moving cargo in and out of the trailer 10. The rear door 160 is exemplary hinged at the bottom of the trailer 10 for pivoting between a trailer-accessible configuration and a trailer-closing configuration. The floor portion 128 is laterally extendable 164 in the illustrated embodiment. The extendable 164 floor portion 128 is adapted to laterally move the helicopter 90 in and out of the trailer 10. The extendable 164 floor portion 128 can fully support the helicopter 90 or be used in conjunction with the rotor suspension mechanism 150 that is interconnected via a connector 154 to the rotor 118 and provided with an extension mechanism 156 for moving the helicopter 90 out of the trailer 10, as depicted in FIG. 8. Support legs 168.1 are optionally provided on corners of the extendable 164 floor portion 128 to prevent undesirable roll of the trailer 10 when the floor 128 is extended and/or when the helicopter 90 is suspended in cantilever outside the trailer 10 with the rotor suspension mechanism 150. The support legs 168.1 of the floor portion 128 are retractable to be recessed in the floor portion 128 or in the trailer 10 when the extendable 164 floor portion 128 is in a retracted or stored configuration 172. Alternatively, support legs 168.2 can be located on the side of the trailer 10 frame to laterally stabilize the trailer 10 when the load on the floor portion 128 is not requiring support legs 168.1 on the floor portion 128. Transversal movement of the helicopter 90 can be made in various fashions like for instance a) being transversally moved with both the extendable 164 floor portion 128 and the rotor suspension mechanism 150 as illustrated in FIG. 8, b) being transversally moved by the extendable 164 floor portion 128 only or c) being transversally moved by the rotor suspension mechanism 150 only. An exemplary sequence of operation is illustrated in FIG. 7 throughout FIG. 10. FIG. 7 and FIG. 8 are illustrating a transversal displacement of the helicopter 90 with both the extendable 164 floor portion 128 and the rotor suspension mechanism 150. The rotor suspension mechanism 150 is further lifting the helicopter 90 once outside the trailer 10 to retract the extendable 164 floor portion 128 in the trailer 10, as exemplified in FIG. 9 and FIG. 10. The helicopter 90 can be lowered by the rotor suspension mechanism 150 when the extendable 164 floor portion 128 is fully retracted in the trailer 10 to lower the helicopter 90 on the ground or on a helicopter-trolley (not illustrated) to move the helicopter 90 further away from the trailer 10.

FIG. 7 and FIG. 8 are also illustrating a lateral door opening mechanism 180 including a plurality of panels 184 thereof than can be hingedly foldable with intervening hinges 188. One can also appreciate the blades 114 of the helicopter 90 are optionally supported by blade supports 146 to prevent downward flexing of the blades 114 under their own weight and bouncing thereof during transportation of the helicopter 90. The blade supports 146 can be also useful to further hold the main rotor 118 and prevent angular movements thereof that could lead to interference between the blades 114 and the tail portion 102 of the helicopter 90, the ceiling of the trailer 10 and other objects that could damage the carefully crafted blades 114, or the trailer 10.

An exemplary rotor suspension mechanism 150 extension mechanism 156 using a plurality of telescopic members 208 is shown in FIG. 11. The telescopic members 208 can be conveniently actuated with a hydraulic or electric actuator (not illustrated) coupled with a mean to move the members 208 like a cable and pulley system. The connector 154 of the rotor suspension mechanism 150 can be embodied in a plurality of ways. FIG. 12 depicts a connector 154 providing two ways to suspend the main rotor 118 of the helicopter 90 and cancel out, partially cancel out or limit load fluctuations and cycling the effects of the weight of the blades 114 on the main rotor 118 to prevent compression of the main rotor 118. A first securing way is achieved by connection of the Jesus nut 212 of the helicopter 90, when such a nut is used, with a Jesus nut connector 216. The Jesus nut 212 can be a main securing fastener of the main rotor assembly 122 axially secured to the main rotor 118 for securing the blades 114 to the main rotor 118. Vertically lifting the helicopter 90 via the Jesus nut 212 is vertically pulling on the main rotor 118 in the direction designed to sustain stresses and does not add pressure on the main rotor 118 and the interconnected main transmission. A second securing way to connect the rotor suspension mechanism 150 to the main rotor 118 of the helicopter 90 is made with a belt securing device 220 extending from the connector 154 or any other portions of the rotor suspension mechanism 150 suitable to achieve the desired result. The belt securing device 220 reaches the rotor hub 224, or the blade grips 228, with a belt 232 to apply tension on the main rotor 118. The belt securing device 220 can be rotatably actuated to apply or remove tension on the belts 232 with a winch-like system or an analogous mechanism. Rotating the belt-securing device 220 is a design efficiently using the limited headroom between the top portion 26 of the trailer 10 and the uppermost portion of the main rotor 118. Both ways are simultaneously used in the embodiment exemplified in FIG. 14 where the belts 232 are secured to secure distal portions of the blade grips 228 while simultaneously securing the Jesus nut 212. Another possible embodiment is securing both the distal portions of the blade grips 228, the proximal portions of the blade grips 228 with belts 232, or the like, and securing the Jesus nut 212 with the Jesus nut connector 216 of the rotor suspension mechanism 150, as shown in FIG. 15, to alleviate pressure from the blades 114 from the main rotor 118. Each method to secure the main rotor 118 with the rotor suspension mechanism 150 can be used individually, partially collectively or collectively to prevent undue compression stresses on the helicopter 90 main rotor 118 and transmission without departing from the scope of the present invention. The pair of belts 232 proximal to the main rotor 118 can be used alone to pull on the main rotor 118. Similarly, the pair of belts 232 distal to the main rotor 118 can be used alone to prevent undue compression stress on the helicopter 90 main rotor 118 and transmission without departing from the scope of the present invention. The rotor suspension mechanism 150 can also provide pivotal capabilities of the connector 154 in respect with the members 208 of the rotor suspension mechanism 150 to allow proper angular positioning of the connector 154 and/or the helicopter 90. A trust bearing, or a pivotable assembly of parts, can be used to allow angular positioning of the connector 154 and/or the helicopter 90. Other possible variations for applying tension on the main rotor 118 of the helicopter 90 to prevent compression stress on the helicopter's main rotor 118 and transmission when moving a blade-equipped helicopter 10 with a wheeled vehicle on the road might become apparent to a skilled reader in the art of helicopter 90 transport and remain within the scope of the present application.

Figure 16:
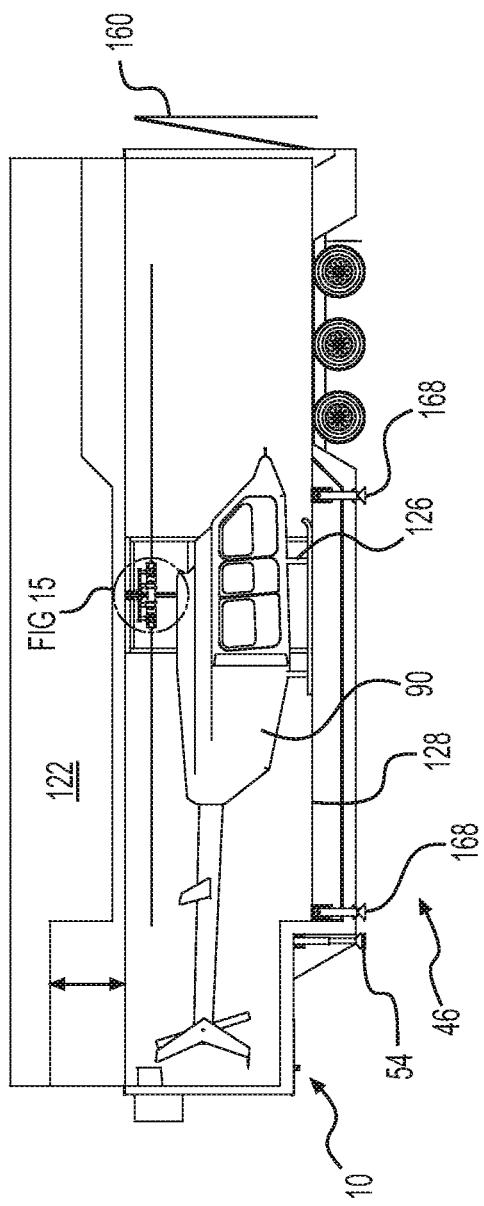
FIG. 16 is illustrating, in accordance with at least one embodiment of the invention, a left elevation view of a trailer with an open lateral door and a helicopter therein.
Figure 17:
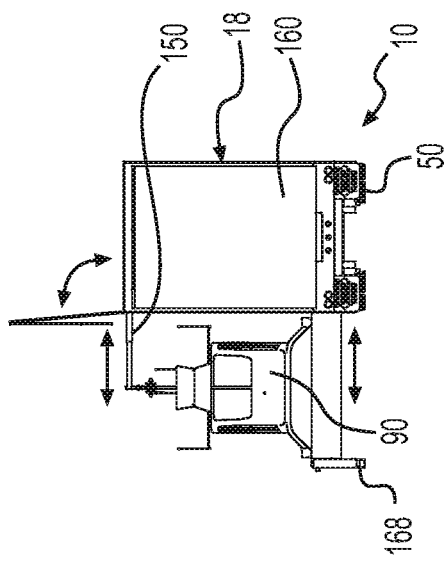
FIG. 17 is illustrating, in accordance with at least one embodiment of the invention, a rear elevation view of a trailer with a helicopter supported by a rotor suspension mechanism and an extendable floor portion.

FIG. 16 and FIG. 17 are showing the methods of securing the main rotor 118 with the rotor suspension mechanism 150 detailed above in conjunction with extension of the rotor suspension mechanism 150 and extension of the floor portion 128.

Moving now to FIG. 18 throughout FIG. 21 illustrating another embodiment for preventing undue compressive stresses on the main rotor 118 of the helicopter 90 for road transportation with a trailer 10. In this embodiment, the rotor suspension mechanism 150 is interconnected to the Jesus nut 212 with a removable Jesus nut connector 216. The rotor suspension mechanism 150 is allowing translational and pivotal movements of the suspended helicopter 90. It is possible to appreciate from FIG. 18 and FIG. 19 that the rotor suspension mechanism 150 can be pivoted 240 and extended 244 to move the helicopter 90 at a desired location inside or outside the trailer 10. The trailer wall-connecting portion 200 of the rotor suspension mechanism 150 is located toward the front section 66 of the helicopter 90 to maximize the space on sides of the helicopter 90. As best seen on FIG. 20, the proximal portions of the main rotor assembly 122, the rotor hub 224 and the blade grips 228, is further suspended with a series of belts 232 secured to a belt-receiving member 250 secured to a ceiling portion 254 of the trailer 10. The belt securing device 220 can be rotatably actuated to apply or remove vertical tension on the belts 232 with a winch-like system or an analogous mechanism. The belts 232 are hence ensuring good and strong vertical hold of the main rotor assembly 122. In that embodiment, four belts 232 are illustrated however, a different number of belts 232 and other configurations thereof can be used without departing from the scope of the invention. The pair of belts 232 proximal to the main rotor 118 can be used alone. Similarly, the pair of belts 232 distal to the main rotor 118 can be used alone to prevent undue compression stress on the helicopter 90 transmission without departing from the scope of the present invention. This embodiment ensures multiple suspension elements are used to pull on the main rotor 118 to prevent applying pressure thereon with the weight of the blades 114 when the helicopter 90 with blades assembled thereto is transported in the trailer 10. It is further illustrated in FIG. 18 and FIG. 19 the landing skids 126 of the helicopter 90 can optionally be secured to the floor portion 128 of the trailer 10 to prevent the helicopter 90 to become "light" and undesirably move in the trailer 10 when the main rotor 118 is under tension for transport. Skids securing elements 258 are secured to the floor portion 128 of the trailer 10 and are further designed to secure a portion of the landing skids 126 of the helicopter 90. Other variants for preventing the helicopter 90 to lift or move in the trailer 10 when the main rotor 118 is under tension remain within the scope of the present invention. Additional blades-securing elements 262 are optionally provided to further secure the blades 114 to the interior of the trailer 10 and also prevent movements of the blades 114 and suspend the blades 114 in the trailer 10 to further reduce or cancel the weight of the blades 114. The blades 114 thus secured can remain in optimal positions and be immobilized properly in the trailer 10 for preventing any damages caused by the movements of the trailer 10.

Figure 22:
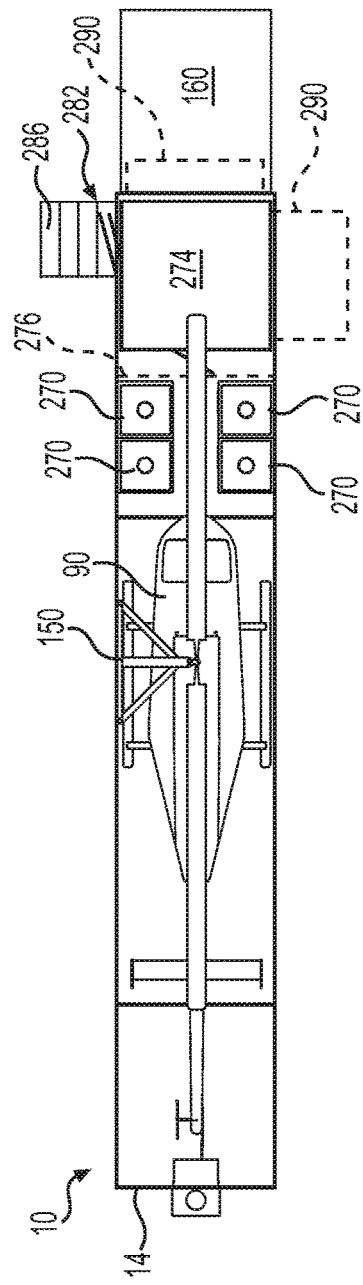
FIG. 22 is illustrating, in accordance with at least one embodiment of the invention, a top plan view of a trailer with a helicopter and a modular space therein.
Figure 23:
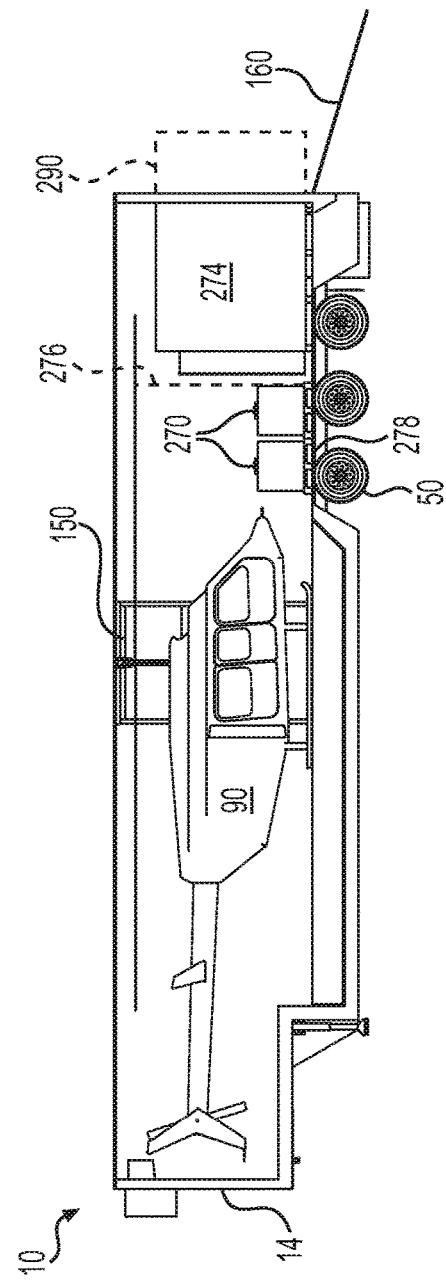
FIG. 23 is illustrating, in accordance with at least one embodiment of the invention, a left elevation view of a trailer with a helicopter and a modular space therein.
Figure 24:
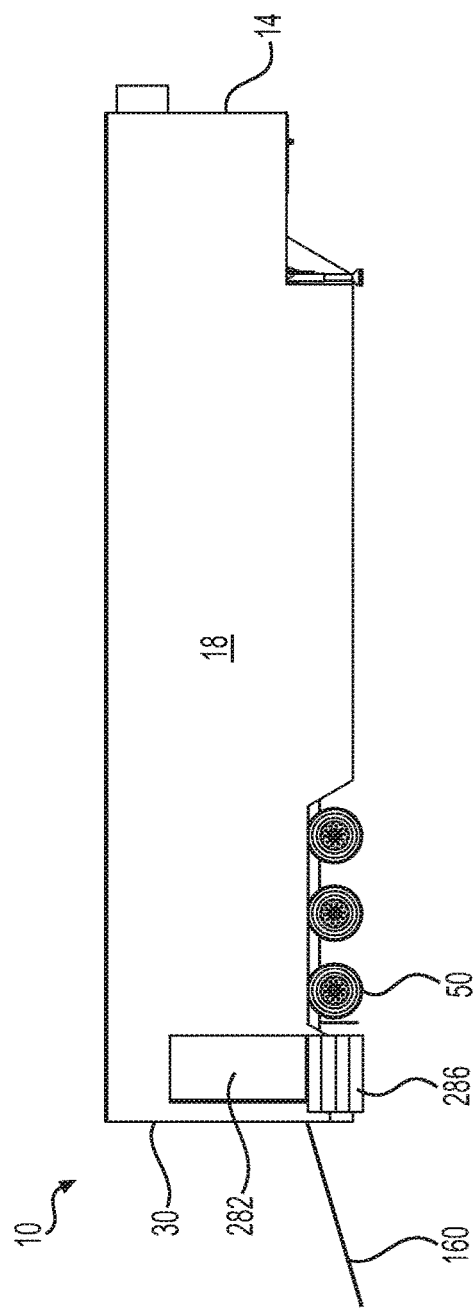
FIG. 24 is illustrating, in accordance with at least one embodiment of the invention, a right elevation view of a trailer.
Figure 25:
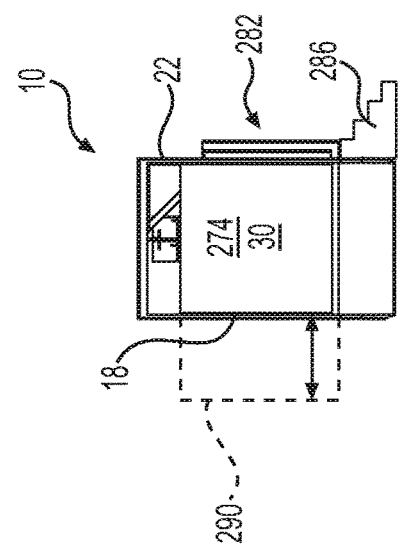
FIG. 25 is illustrating, in accordance with at least one embodiment of the invention, a rear elevation view of a trailer.
Figure 32:
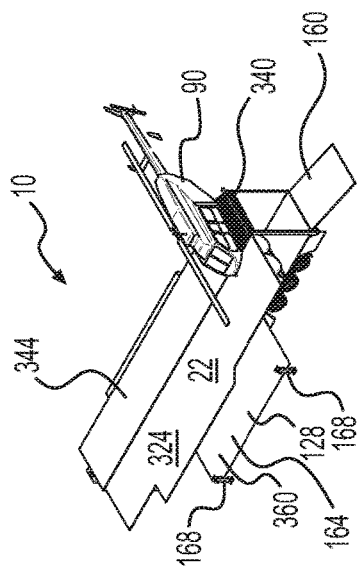
FIG. 32 is illustrating, in accordance with at least one embodiment of the invention, an isometric view of a trailer with a helicopter thereon.

The trailer 10 can be adapted for transporting other cargo with the helicopter 90. A modular space can be used in the trailer 10 for accommodating various purposes. The modular aspect of the space allows for simple modules replacement in the trailer 10. Modules like, inter alia, office space, air conditioned space, heated space, internet access for weather forecasts, flight plan and other communications, client reception space, technical library of helicopter maintenance and rest/relaxation space are contemplated in the scope of the present invention. For instance, and referring to FIG. 22 and FIG. 23, tanks 270 and an exemplary work module 274 are installed in the trailer 10. The tanks 270 can contain fuel or other liquids, like chemical herbicides to be sprayed on fields by the helicopter 90, once arrived at work destination. Tanks full of liquid(s) are heavy and are preferably located over the wheels 50 of the trailer 10. The tanks 270 and the work module 274 can be installed on pallets 278 to be easily movable from side portions 18, 22 of the trailer 10, or from the rear portion 30 thereof. The work module 274 can house an operation center for the operation and the tasks of the helicopter 90 and/or a mechanics workshop type of facility for maintenance of the helicopter 90. The work module 274 can be replaced with a separating wall 276 or curtain isolating a non-modular work or operation space. The work module 274 or the operation space for complete helicopter exploitation can be extended by an optional slide-out portion 290. The tanks 270 and the work module 274 are properly secured inside the trailer 10. It can be appreciated the trailer 10 is further equipped with a service door 282 and a staircase 286 to ease access to the work module 274. Other modular cells adapted for VIP transport, medical transportation, sling module, spreading module, video/audio recordation module, fire combat module and air patrol are contemplated and within the scope of this description.

It might be desirable to provide additional protection to the helicopter 90. One option is to put the helicopter 90 in a helicopter crate 300 as illustrated in FIG. 26 and FIG. 27. The helicopter crate 300 is sized and designed to receive therein a helicopter 90 to further protect and anonymize the content in the helicopter crate 300 and can be embodied in an adapted shipping container. The helicopter crate 300 can be lifted and moved in/out of the trailer 10 with the rotor suspension mechanism 150 or other comparable mechanism. The helicopter 90 is secured in the helicopter crate 300 with skids-securing elements 258 and blades-securing elements 262. A rotor assembly support 304 included on top of the rotor assembly 122 of the helicopter 90 inside the helicopter crate 300 is used to secure and apply tension on the rotor assembly 122 of the helicopter 90 to prevent compressing the main rotor 118 and the transmission of the helicopter 90 when moving the helicopter crate 300 by itself or when it is installed and secured with crate locking devices 308 in the trailer 10.

Another embodiment is illustrated in FIG. 28 and FIG. 29. Indeed, the extendable 164 floor portion 128 can be used as a work platform 312 that can be enclosed with curtains 316 or light walls (not illustrated) and covered by the upwardly pivotable left portion 22 of the trailer 10 that is acting as a roof 324 for the work platform 312 extending on the side of the trailer 10. Additional large volume tanks 320 are secured inside the trailer 10 over the wheels 50. The extended width usable for maintenance and mechanics work is about two times the trailer's 10 width of about 488 centimeters (16 feet). It can be appreciated the left portion 22 of the trailer 10 is used as a roof portion 324 and can be angled upwardly 22.1 as illustrated in FIG. 29 and FIG. 29 to allow moving in and out the helicopter 90 without interference. The angled roof portion 324 can also be helpful to channel rain toward the trailer 10 to keep the workspace dry.

Figure 33:
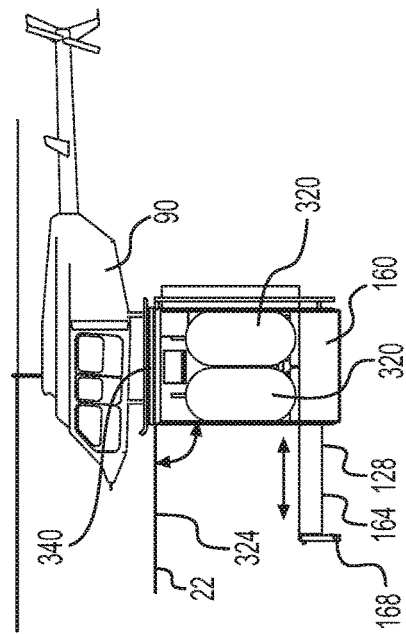
FIG. 33 is illustrating, in accordance with at least one embodiment of the invention, a rear elevation view of a trailer with a helicopter thereon.
Figure 30:
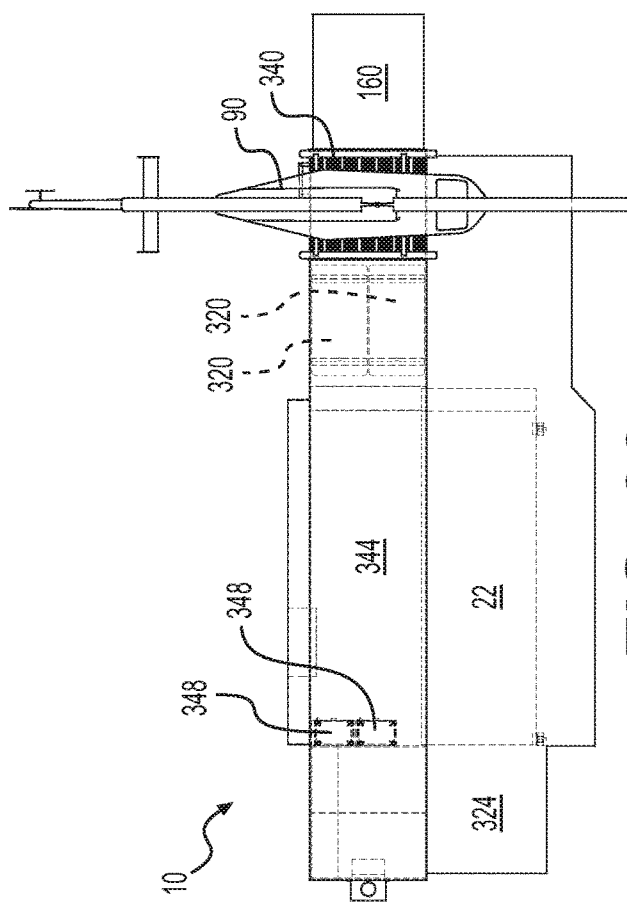
FIG. 30 is illustrating, in accordance with at least one embodiment of the invention, a top plan view of a trailer with a helicopter thereon.
Figure 31:
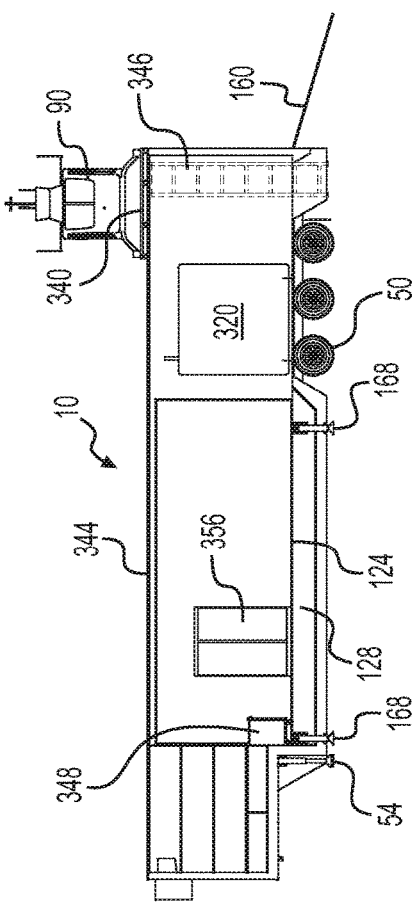
FIG. 31 is illustrating, in accordance with at least one embodiment of the invention, a left elevation view of a trailer with a helicopter thereon.
Figure 42:
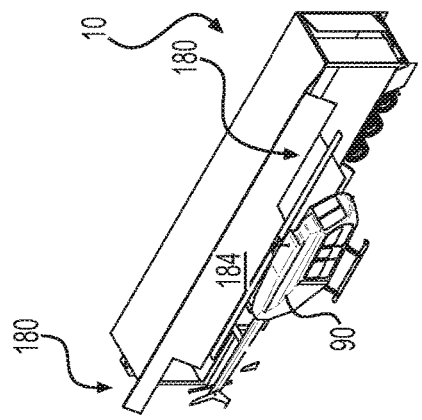
FIG. 42 is illustrating, in accordance with at least one embodiment of the invention, an isometric view of a trailer with a helicopter suspended thereto.

FIG. 30 throughout FIG. 33 are illustrating another embodiment of the invention where the trailer 10 is used to receive thereon a helicopter 90. A helipad 340 is located on the roof 344 of the trailer 10. The helipad 340 can be embodied as a platform sized and designed to receive thereon a helicopter 90. The helipad 340 can be permanently or temporarily secured to the roof 344 of the trailer 10. A helicopter 90 can use the roof helipad 340 to land at a location where it is difficult or impossible to land directly on the ground because of trees, bushes, dirt, water or sand. Landing on top of the trailer 10 at a distance from the ground can alleviate the level of difficulty compared to landing directly on the ground. The location of the helipad 340 on the trailer 10 can vary depending on the specifics of the situation in the field and accessible by different means, like a ladder 346, without departing from the scope of the invention. Toolboxes 348, tanks 320 and a work area 360 are accessible through a door 356. A side panel 22 of the trailer 10 is pivotable to provide a roof 344 over an external work area 360 with the extendable 164 floor portion 128.

Another alternate embodiment of a helipad 340 located on the roof 344 of the trailer 10 is depicted in FIG. 34 throughout FIG. 37. In the embodiment, the helipad is generally located toward the center of the trailer 10 and configured to receive the helicopter 90 in a longitudinal direction of the trailer 10 in contrast with the previous helipad 340 embodiment where the helicopter 90 is disposed transversally on the trailer 10. The helipad 340 of the present embodiment is supported by reinforcements 364 disposed temporarily or installed permanently in the trailer 10. Moreover, the width of the trailer 10 is extended with a pair of lateral extension portions 368 pivotable 372 about upper edges of the trailer 10. Other variations are possible and they remain within the scope of the present application.

The rotor suspension mechanism 150 can be positioned to move a helicopter 90 through the rear portion 30 of the trailer 10, as exemplified in FIG. 38 and FIG. 39. The translation movement of the helicopter 90 can be helped with wheels 124 that can be removably secured to the landing skids 126. In that embodiment, the roof 344 can be opened to allow the helicopter 90 to be moved from the central section 70 of the trailer 10 over the higher floor portion 128 of the rear section 74 of the trailer 10 out from the rear section 74 of the trailer 10. The pivotable roof 344 can include an integrated rotor suspension mechanism 150 that allows suspending and lifting the helicopter 90 for clearing the higher rear portion 74 receiving wheels of the trailer 10 and moving the helicopter 90 out of the rear portion of the trailer 10.

Figure 43:
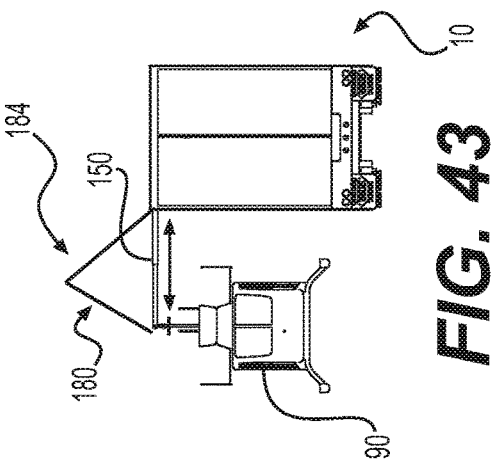
FIG. 43 is illustrating, in accordance with at least one embodiment of the invention, a rear elevation view of a trailer with a helicopter suspended thereto.
Figure 40:
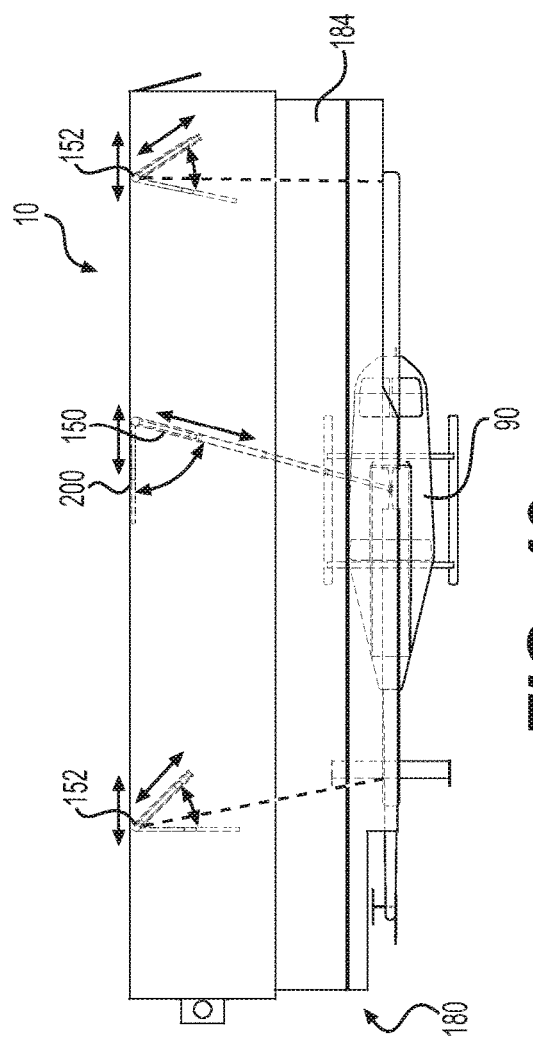
FIG. 40 is illustrating, in accordance with at least one embodiment of the invention, a top plan view of a trailer with a helicopter suspended thereto.
Figure 41:
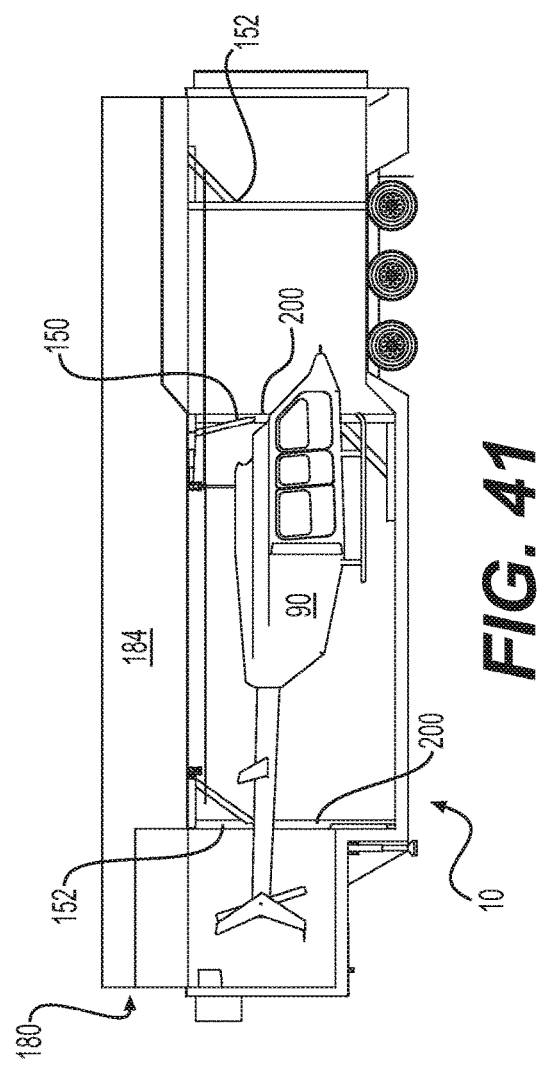
FIG. 41 is illustrating, in accordance with at least one embodiment of the invention, a left elevation view of a trailer with a helicopter suspended thereto.

FIG. 40 throughout FIG. 43 are illustrating another alternate embodiment of the invention using a rotor suspension mechanism 150 with substantial angular and translational displacements. The present embodiment is also including a tail suspension mechanism 380 for assisting the lifting and displacing the rotor suspension mechanism 150. A pair of blade suspension mechanisms 152 are optionally added to the trailer 10 to perform a task analogous to the rotor suspension mechanism 150 but intended to respectively support the blades 114 of the helicopter 90 to ensure they are not moving, bending or springing when the helicopter 90 is moved in/out of the trailer 10 and when the helicopter 90 is transported in the trailer 10. The rotor suspension mechanism 150 and the pair of blade suspension mechanisms 152 can be longitudinally adjusted, angularly adjusted and extended in/out of the trailer 10. The rotor suspension mechanism 150 and the pair of blade suspension mechanisms 152 can be simultaneously actuated to provide optimal movements of the helicopter 90 and the blades 114. The rotor suspension mechanism 150 and the pair of blade suspension mechanisms 152 can be positioned parallel to each other to simplify the actuation geometry thereof although this configuration is not illustrated in the Figures.

Lastly, FIG. 44 throughout FIG. 47 are illustrating an embodiment opening the roof 344 in two portions that are folding respectively toward the right portion 18 and the left portion 22 of the trailer 10. The right portion 18 and the left portion 22 are also provided with hinges 188 with the trailer 10 to laterally open and allow the helicopter 90 to land directly in the trailer 10 and take off directly from the trailer 10. Folding portions 344, 18, 22 of the trailer 10 are hinged 188 together and actuated with electric or hydraulic actuators (not illustrated).

Figure 50:
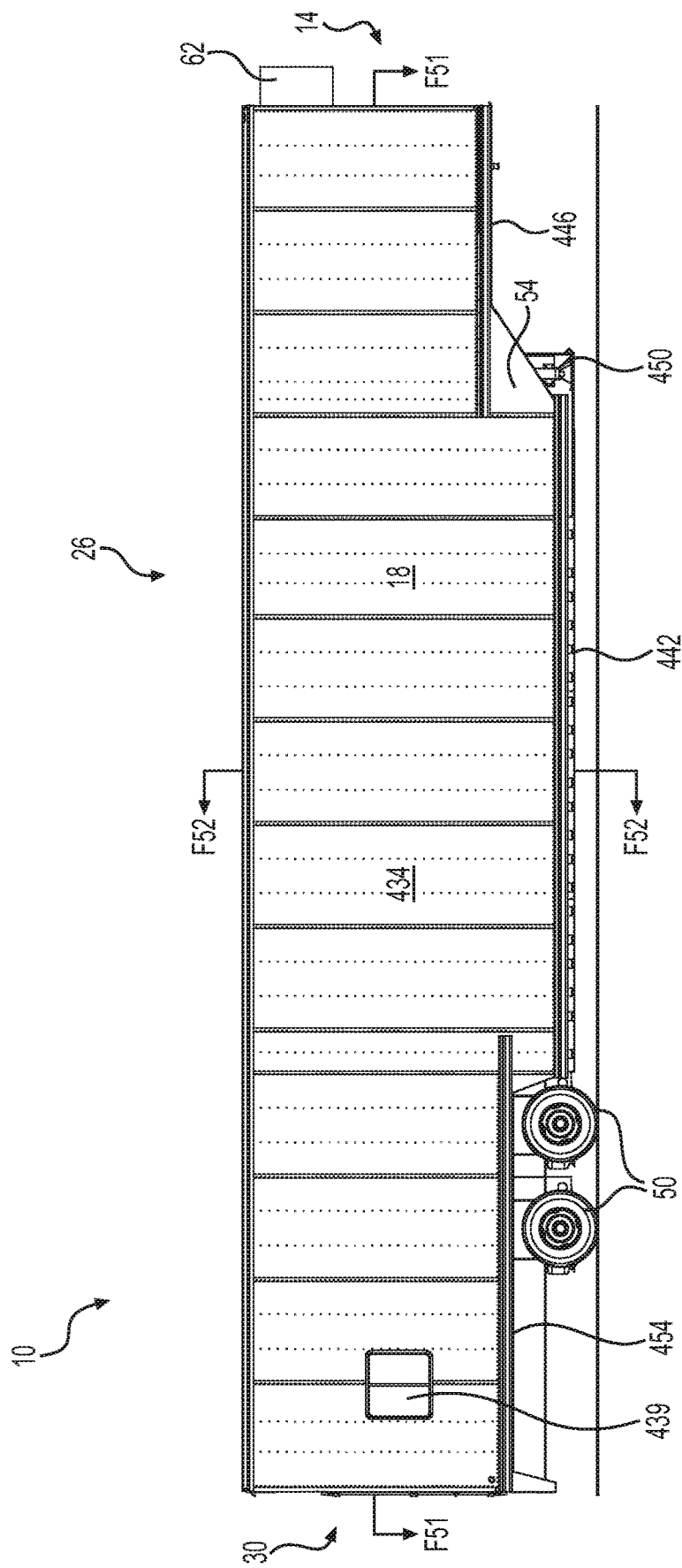
FIG. 50 is illustrating, in accordance with at least one embodiment of the invention, a right-side elevation view of a trailer for transporting a helicopter therein.
Figure 67:
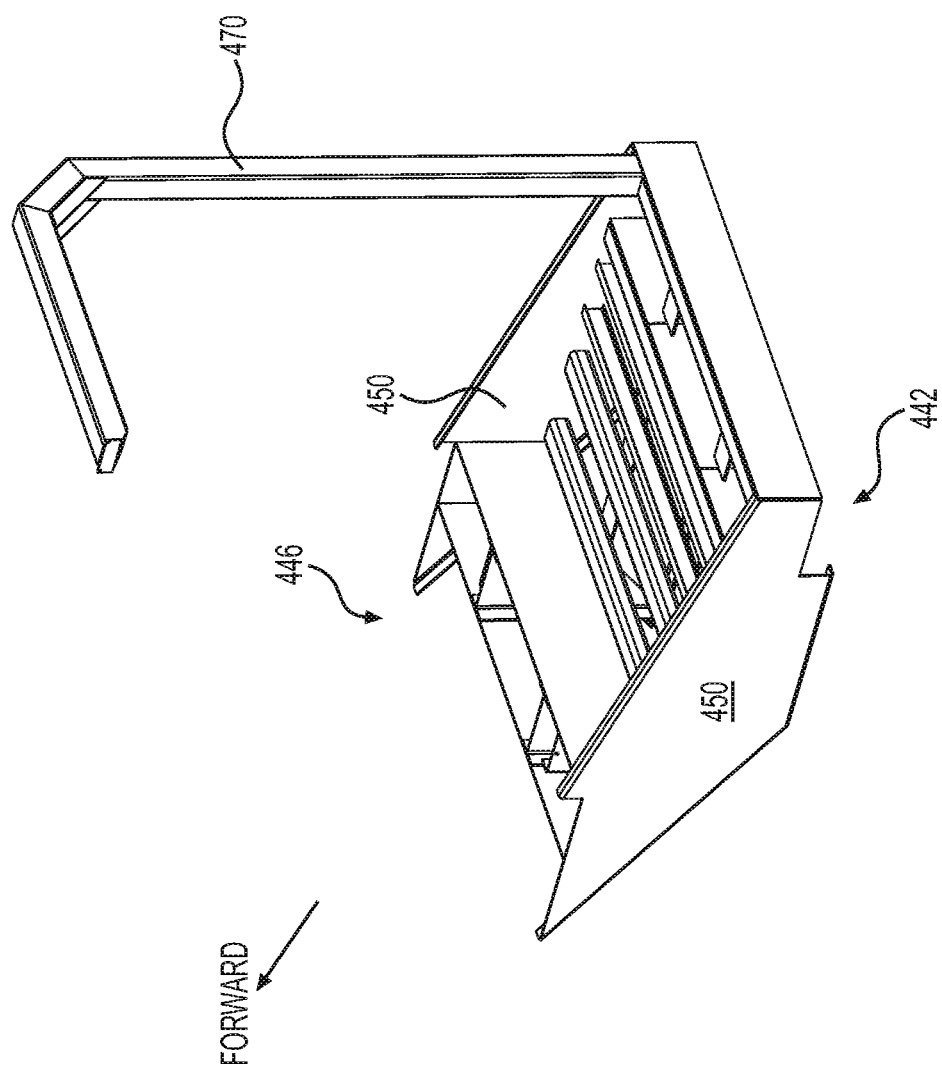
FIG. 67 is illustrating, in accordance with at least one embodiment of the invention, a rear right perspective view of a portion of a trailer for transporting a helicopter therein.

Another embodiment of the invention is depicted in FIG. 48 throughout FIG. 67. As best seen in FIG. 48 throughout FIG. 50, the trailer 10 of this embodiment includes a longitudinal axis 406, a right portion 18, a left portion 22, a top portion 26, a rear portion 30. The left portion of the trailer 10 is including a main door 410. The main door 401 could alternatively be located on the opposite side of the trailer 10 without departing from the scope of the present application. A pair of main doors 410 located on both the right portion 18 and the left portion 22 of the trailer 10 is also contemplated in alternate embodiments not illustrated therein. The present embodiment including a main door 401 on the left portion 22 of the trailer 10 is going to be discussed below as an example to ease the reading of this description. In reference with the illustrated embodiment, the main door 410 includes three panels, a low panel 414, an intermediate panel 418 and an upper panel 422 adapted to be vertically superposed and upwardly slidable to allow access in the trailer 10. The three panels 414, 418 and 422 are vertically superposed when the main door 410 is in a closed configuration 426. The main door 410 is extending from the front portion 14 of the trailer 10 to almost the rear portion 30 of the trailer 10. The location of the main door 410 could be adjusted longitudinally on the trailer 10 to match different characteristics of the trailer 10. The length of the main door 410 is at least of 1290 centimeters (508"), dimension sufficient to receive therein a length of a helicopter 90 (not illustrated) in a condition reasonably ready for flight with the blades 114 attached to the main rotor 118. Optimal length of the main door 410 is about 1366 centimeters (538") or about 38 centimeters (15") in front and at the rear of the helicopter 90. Other lengths of the main door 410 can be contemplated however a longer main door 410 is going to have a detrimental effect on the trailer 10 flexion. The height of the main door 410 is ideally opening the complete height of the internal volume of the trailer 10. The height of the main door 410 as embodied is about 352 centimeters (138.5") however a reduced height of the main door 410 remains contemplated by the present description however restricting the size of the helicopter 90 that can be housed in the trailer 10. The main door 410 is constructed in the embodiment in a manner leaving a rear section 430 of the left portion 22 of the trailer 10 closed with a wall portion to serve other purposes of some are listed in the present description. It can be appreciated the low panel 414 of the main door 410 is longitudinally shorter than the intermediate panel 418 and the upper panel 422 to reach and cover the low floor portion 442 of the trailer 10. The right portion 18 of the trailer 10 illustrated in FIG. 50 is including a wall 434 over the entire side with a window opening 438 that is aligned with the rear section 430. The rear portion 30 of the trailer 10 includes an elevated rear floor portion 454.

The significant length of the main door 410 is preventing using a mechanically resistant wall structure that would provide mechanical strength to the trailer 10 structure. Given the limited thickness of a low floor portion 442 of about 17.75 centimeters (7") to create the required internal headroom in the trailer 10, it can also be appreciated that the trailer 10 requires an alternative structure to provide the required trailer mechanical strength, particularly addressing the flex requirement of the trailer 10. The embodied trailer 10 includes a pair of structural side members 450 interconnecting the low floor portion 442 with a high floor portion 446 disposed in front of the trailer 10. The structural side members are embodied as steel plates of about 10 millimeters. The structural side members 450 are providing a mechanical structure to the assembly in a fashion securing the low floor portion 442 while keeping the corresponding internal volume of the trailer 10 usable for the intended purpose. The structural side members 450 are best seen in FIG. 67.

Figure 51:
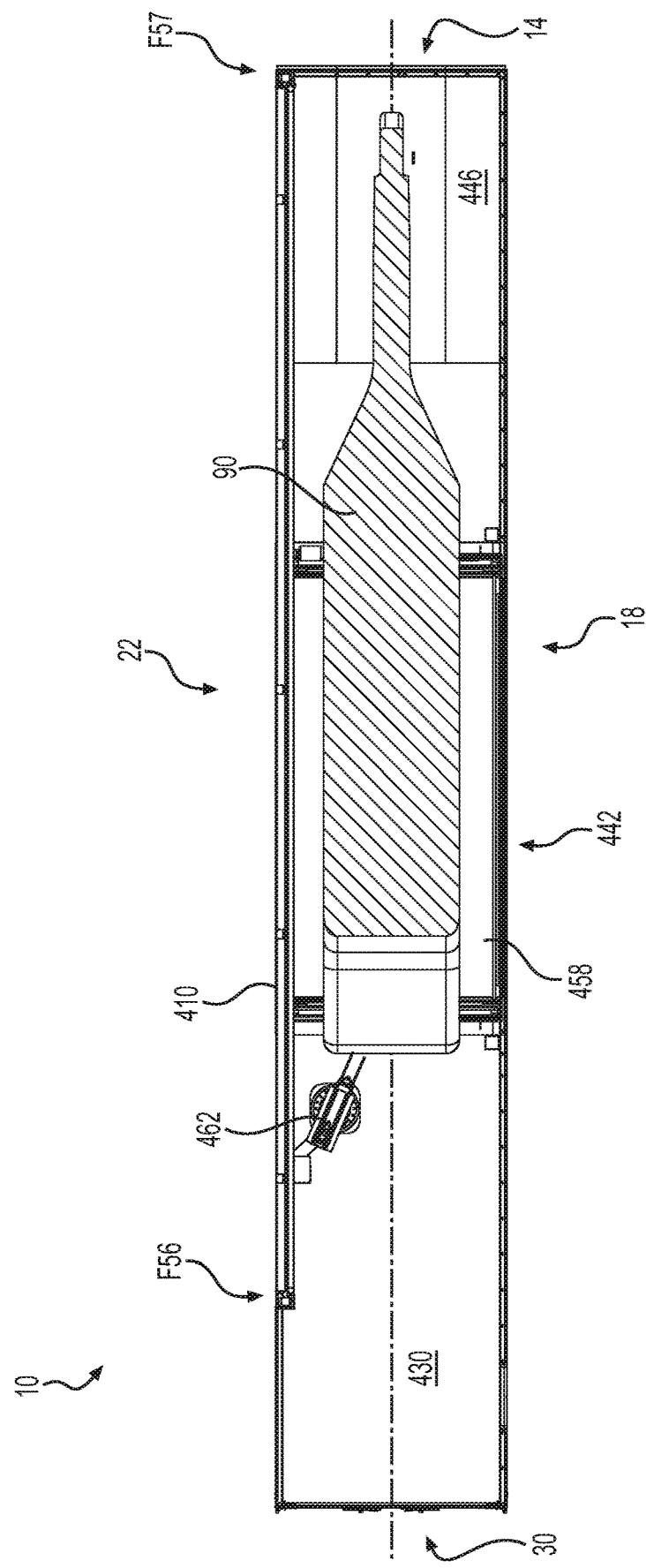
FIG. 51 is illustrating, in accordance with at least one embodiment of the invention, a top plan section view of a trailer for transporting a helicopter therein.
Figure 52:
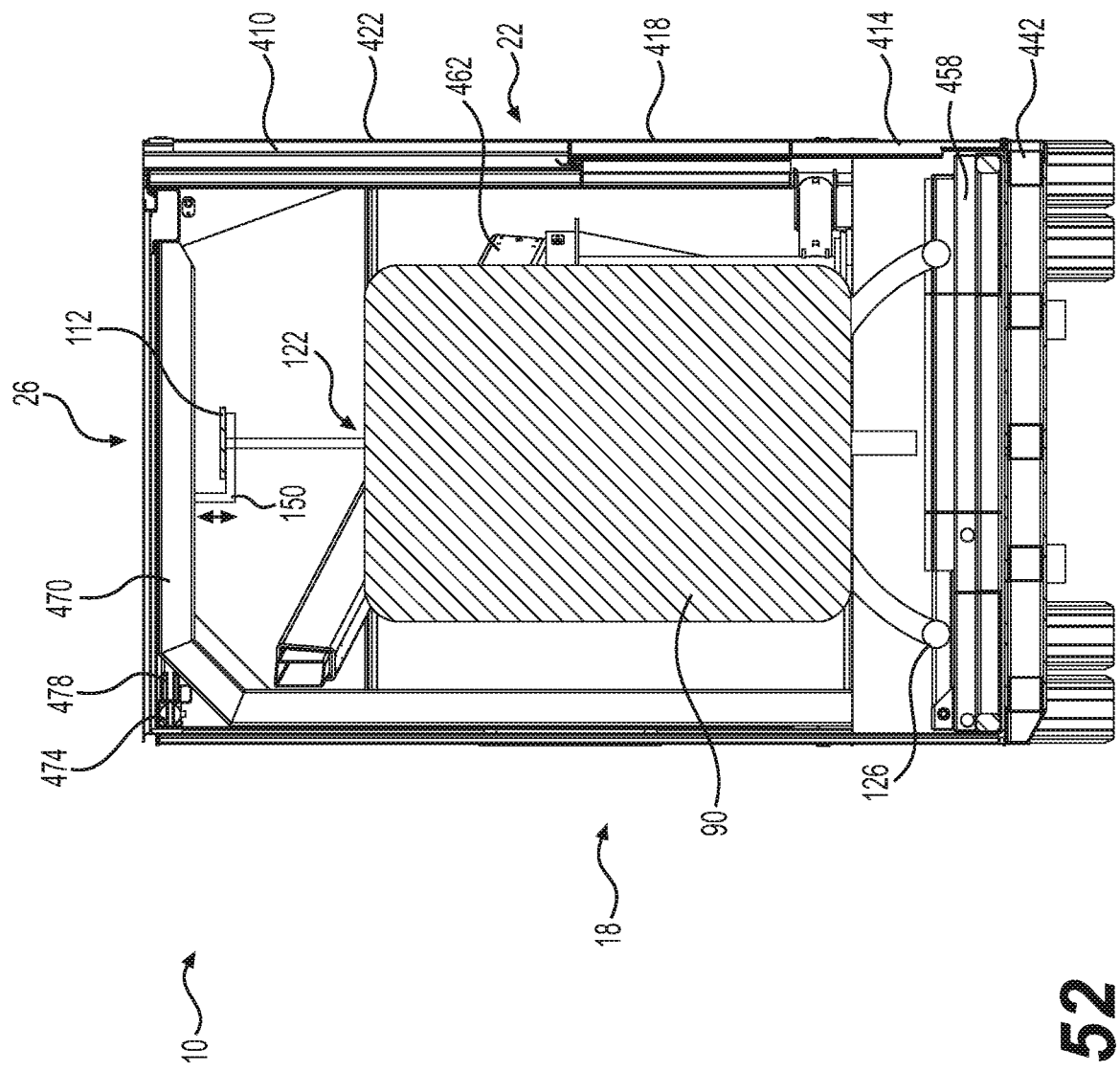
FIG. 52 is illustrating, in accordance with at least one embodiment of the invention, a front elevation section view of a trailer for transporting a helicopter therein.
Figure 53:
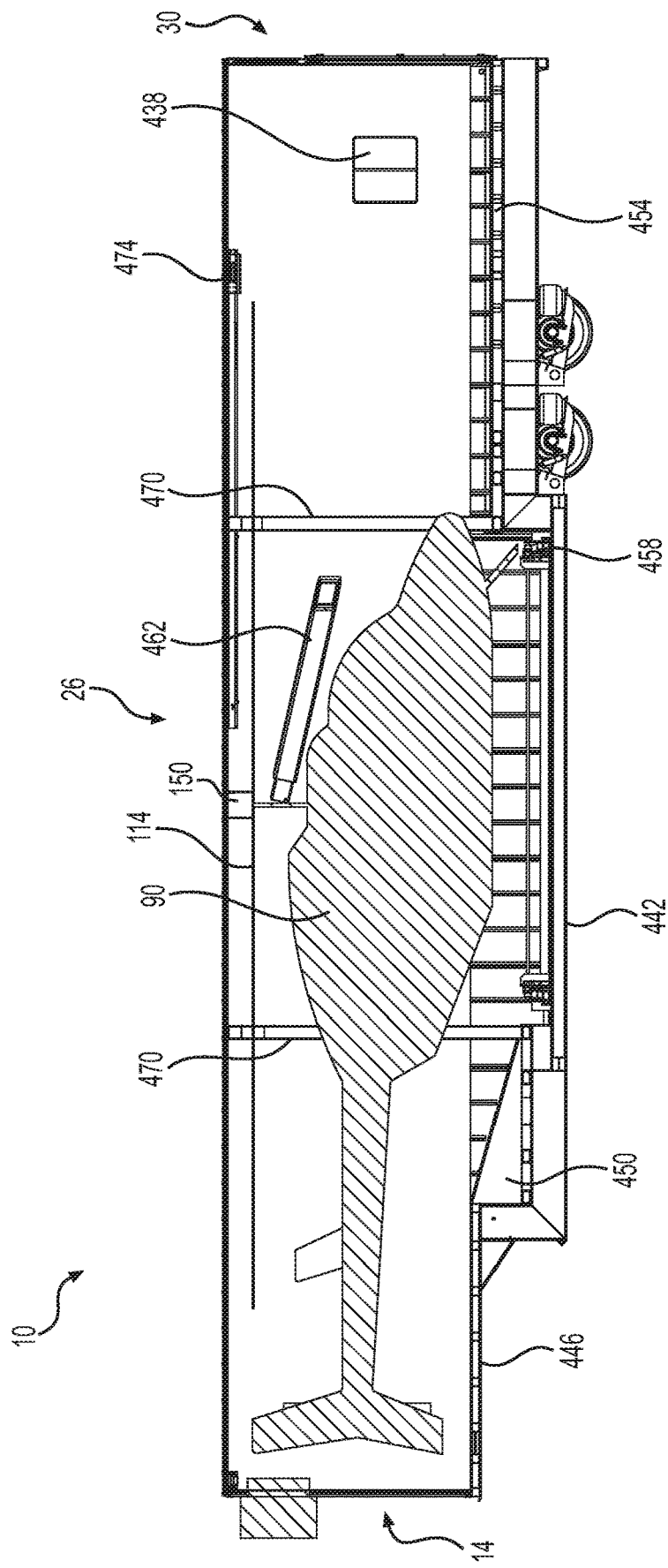
FIG. 53 is illustrating, in accordance with at least one embodiment of the invention, a right-side elevation section view of a trailer for transporting a helicopter therein.

Moving to FIG. 51, FIG. 52 and FIG. 53 illustrating section views of the trailer 10 with the helicopter 90 stored therein. The helicopter 90 is laterally centered in the trailer 10 and is facing rearward in the trailer 10 to locate the tail portion 102 of the helicopter 90 over the high floor portion 446. The helicopter 90 is located in the trailer 10 in a position where the landing skids 126 of the helicopter 90 are resting on a laterally extendable floor portion 458. The laterally extendable floor portion 458 is embodied with a thickness of about 17.8 centimeters (7") with a material thickness of about 6 millimeters (0.25") that is folded of about 11 centimeters (4.25") on each side, a transversal length of about 246 centimeters (97") for an overall width of the trailer 10 of about 259 centimeters (102") and a longitudinal length of about 645 centimeters (254"). The thickness of the laterally extendable floor portion 458 is of significant importance given the maximal overall legal height limit of a road trailer that is about 411.5 centimeters (162") and in order to provide an internal headroom of about 345.5 centimeters (136") for receiving a helicopter 90 therein. The available height between the upper surface of the laterally extendable floor portion 458 and the ceiling of the trailer 10 is about 360 centimeters (141.5"). A thicker laterally extendable floor portion 458 or a thicker low floor portion 446 is going to reduce the available headroom inside the trailer 10 and is also have a limiting effect on the maximum size of the helicopter 90 that can be housed in the trailer 10. Furthermore, the trailer 10 can be optionally insulated, which is adding to the walls thickness and increase the challenge of maximizing the internal volume of the trailer 10.

A movable arm 462 is operatively secured in the trailer 10 over the high floor portion 446. The movable arm 462 is adapted to pivot and extend and is preferably located on the lateral side of the trailer 10 where the main door 410 is located to facilitate management of the helicopter 90 on and off the laterally extendable floor portion 458. As best seen in FIG. 52 and FIG. 53, the trailer 10 includes a pair of structural members 470 providing sufficient strength for supporting the top portion 26 of the trailer within acceptable flexion thereof despite the wide void created in the body structure of the trailer 10 by the main door 410. The structural members 470 are also supporting the weight of the helicopter 90 when the main rotor 118 is suspended in the trailer 10 when the helicopter 90 is transported on the road. The pair of structural members 470, illustratively disposed on both longitudinal sides of the laterally extending floor portion 458, are secured to the trailer's floor and are raising next to the lateral sidewall of the trailer 10 to further extend along the ceiling inside the trailer 10. The structural members 470 are hence leaving the left wall portion 22 opened to accommodate the main door 410 opening. Also visible in FIG. 52, a hydraulic cylinder 474 with pulleys 478 used for actuating the main door 410 are located on the upper end corner.

Figure 54:
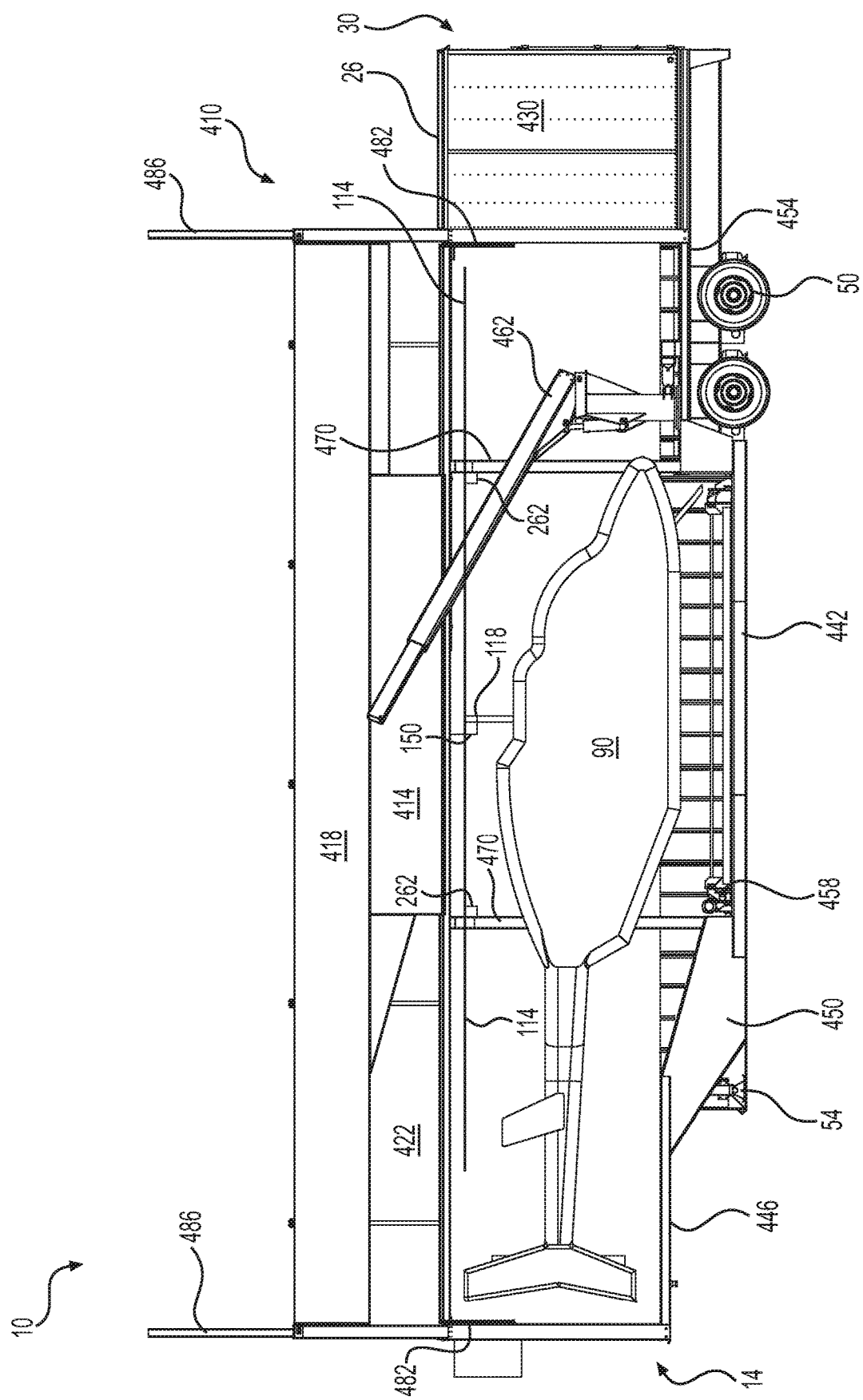
FIG. 54 is illustrating, in accordance with at least one embodiment of the invention, a right-side elevation view of a trailer for transporting a helicopter therein.
Figure 55:
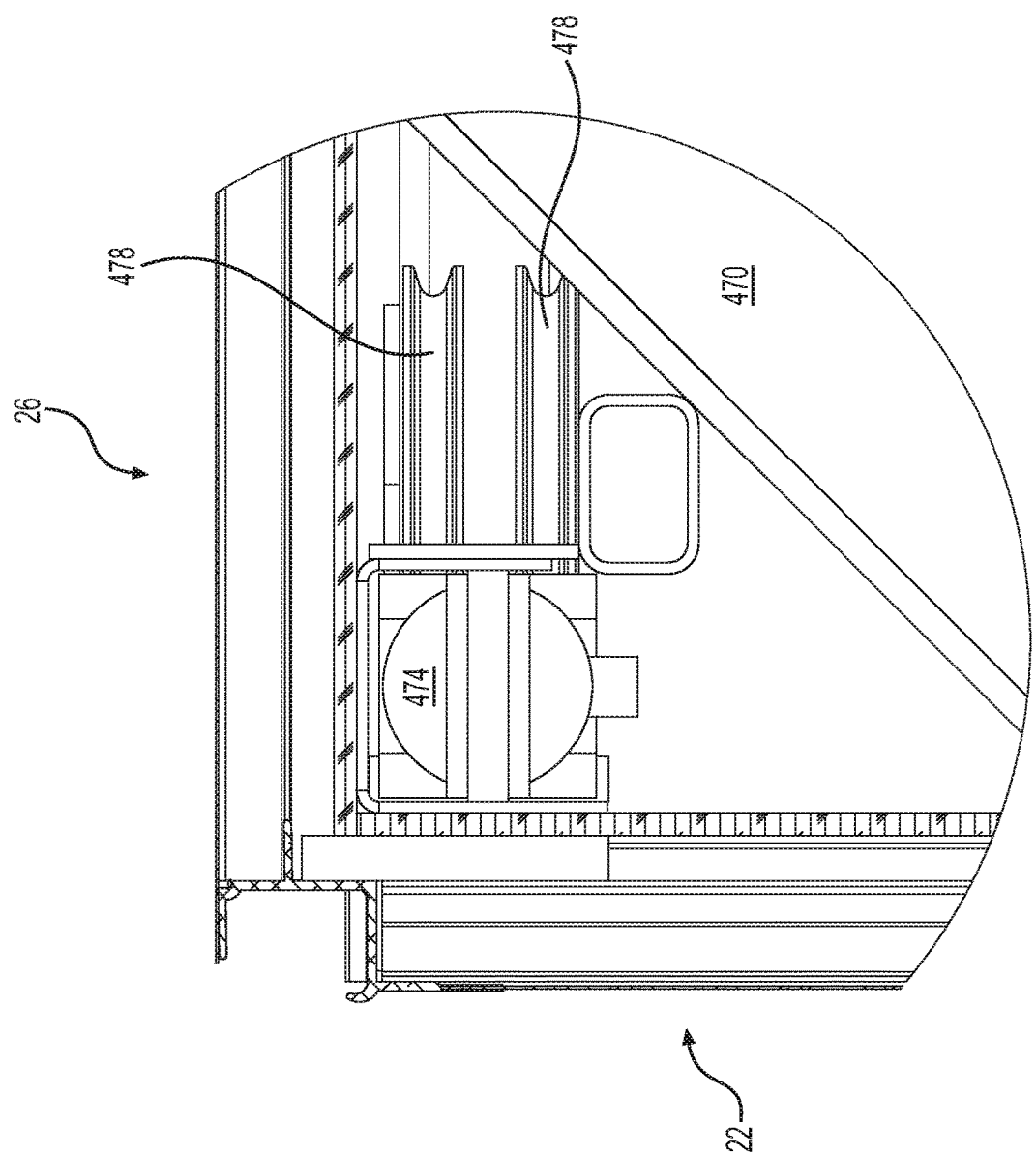
FIG. 55 is illustrating, in accordance with at least one embodiment of the invention, partial rear elevation section view of a portion of a trailer for transporting a helicopter therein.
Figure 57:
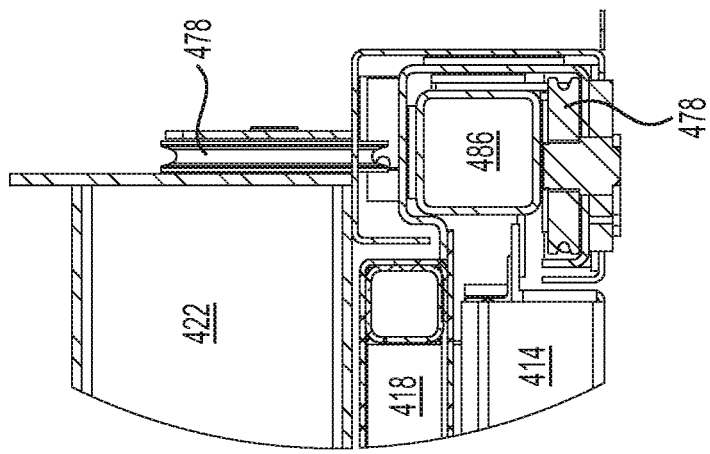
FIG. 57 is illustrating, in accordance with at least one embodiment of the invention, a partial top plan section view of a portion of a trailer for transporting a helicopter therein.
Figure 56:
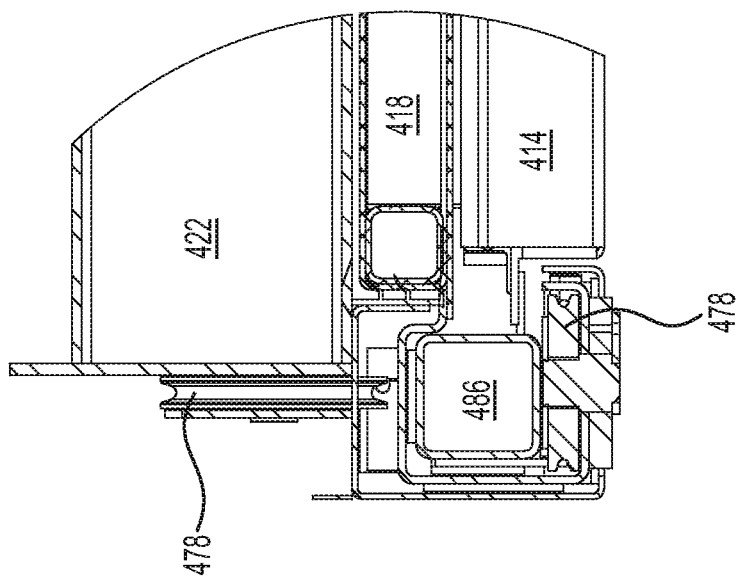
FIG. 56 is illustrating, in accordance with at least one embodiment of the invention, a partial top plan section view of a portion of a trailer for transporting a helicopter therein.

FIG. 54 shows the trailer 10 with the main door 410 open where all three panels 414, 418, 422 are superposed above the top portion 26 of the trailer 10 allowing complete opening of the internal helicopter-receiving space in the trailer 10. The main door opening system is including the hydraulic cylinder 474 with pulleys 478, best seen in FIG. 55, interconnected with cables 482 to move the three panels 414, 418, 422 assembly vertically guided by a pair of guide members 486. The assembly of the main door 410 mechanism is illustrated with more details in FIG. 56 and FIG. 57. A skilled reader could understand from the assembly that the low panel 414 is moved vertically first, then the intermediate panel 418 and last the upper panel 422 is moved vertically with the other panels 414, 418. Alternatively, the main door 410 could be made of two panels also moving vertically as described above. In that configuration, the low panel 414 and the intermediate panel 418 are embodied as a single panel. It is also illustrated in FIG. 54 that the extendable arm 462 is raising above the top portion 26 of the trailer 10 to have enough clearance to raise the helicopter 90 laterally extending outside the trailer 10, by the main rotor 118, on and off the laterally extendable floor portion 458. The laterally extending floor portion 458 is laterally moving the helicopter 90 entirely out of the trailer 10 and optimally providing a lateral clearance of about 30-50 centimeters (11"-20") from the trailer 10.

Figure 58:
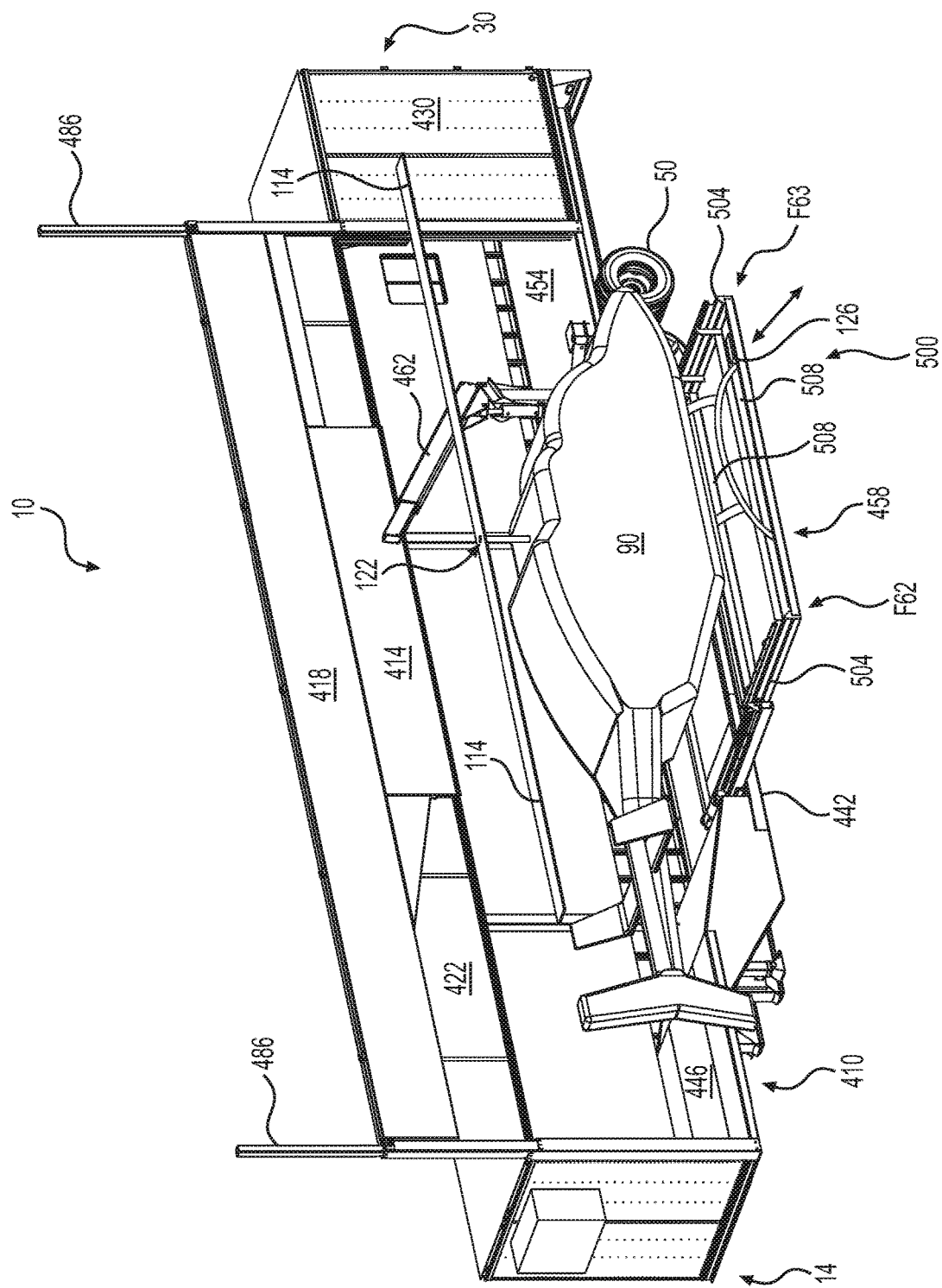
FIG. 58 is illustrating, in accordance with at least one embodiment of the invention, a front right perspective view of a trailer for transporting a helicopter therein.
Figure 59:
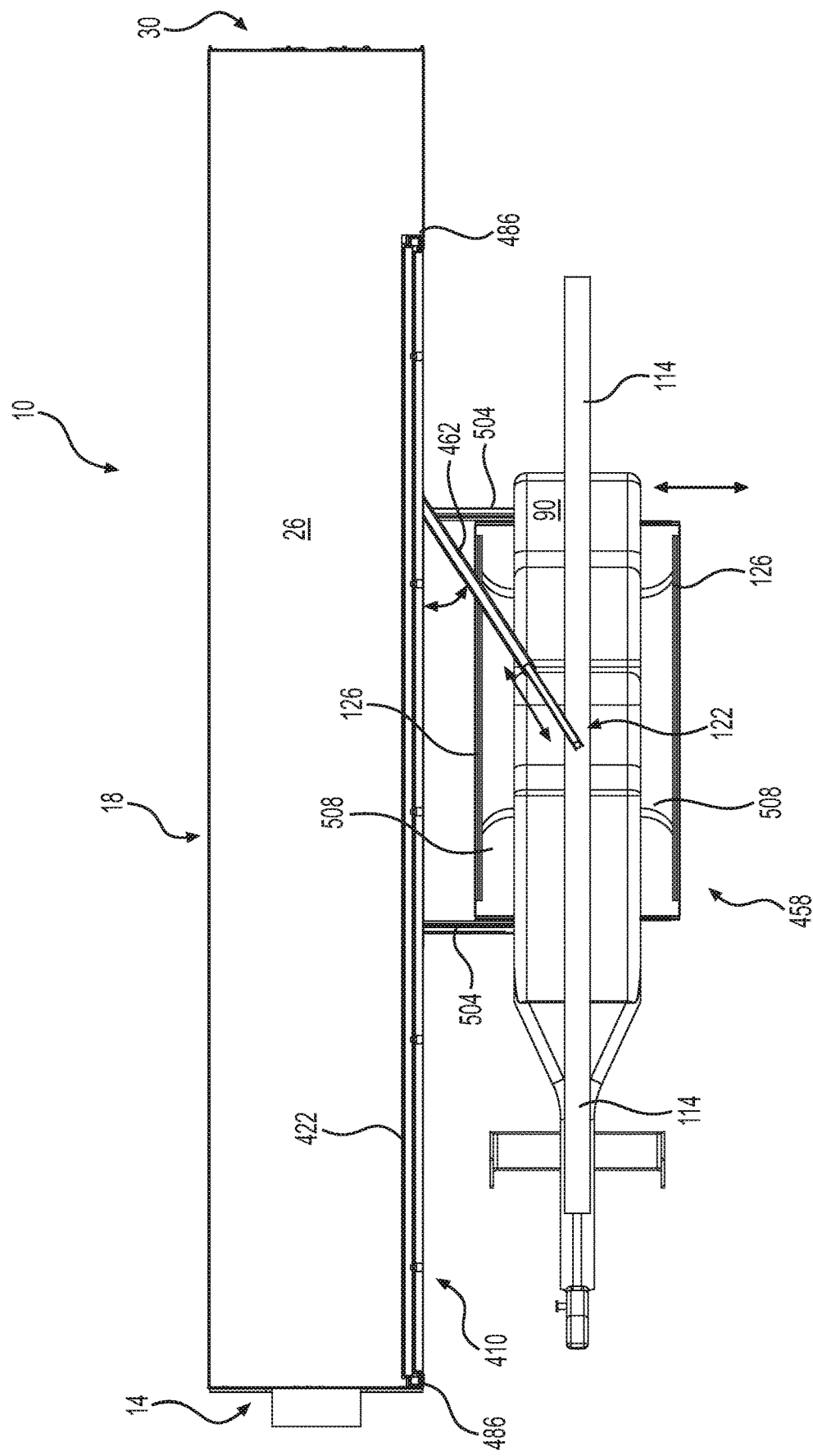
FIG. 59 is illustrating, in accordance with at least one embodiment of the invention, a top plan view of a trailer for transporting a helicopter therein.
Figure 60:
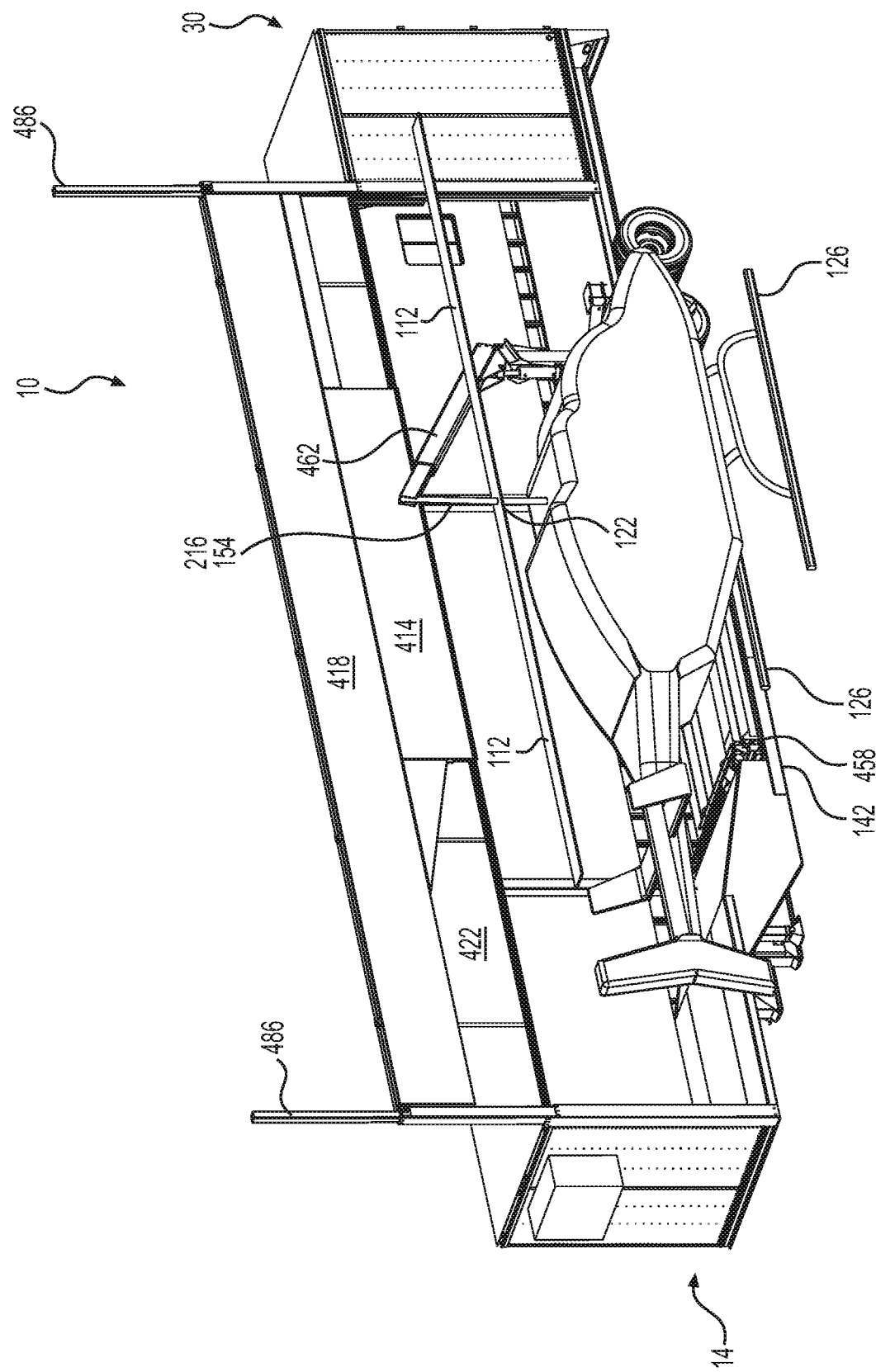
FIG. 60 is illustrating, in accordance with at least one embodiment of the invention, a front right perspective view of a trailer for transporting a helicopter therein.
Figure 61:
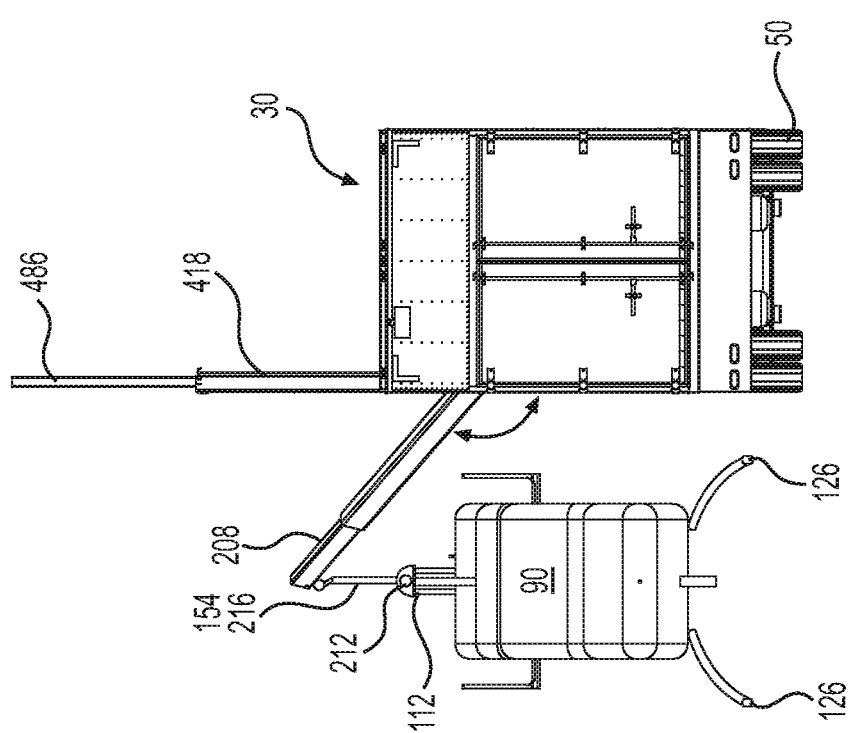
FIG. 61 is illustrating, in accordance with at least one embodiment of the invention, a front elevation section view of a trailer for transporting a helicopter therein.

FIG. 58 illustrates the trailer 10 with the main door 410 open and the laterally extendable floor portion 458 in the extended configuration 500. The laterally extendable floor portion 458 of the present embodiment is laterally movable of about 315 centimeters (124") with a three sections drawer-style mechanism. The laterally extendable floor portion 458 includes a series of slidably interconnected members 504 moving a pair of skids receivers 508 configured to receive thereon the pair of landing skids 126 for supporting the helicopter 90. The pair of skids receivers 508 are transversally adjustable to match various landing skids 126 widths of helicopters 90 of different sizes and configurations. An exemplary sequences of operations for moving the helicopter 90 out of the trailer with the laterally extendable floor portion 458 can read as follows: 1) opening the main door 410 as illustrated in FIG. 53; 2) laterally extending the laterally extendable floor portion 458 as illustrated in FIG. 58; 3) pivoting and extending the extendable arm 462 as illustrated in FIG. 58 and FIG. 59; 4) connecting the end of the extendable arm 462 to the main rotor assembly 122 of the helicopter 90 as illustrated in FIG. 61; 5) moving upward the helicopter 90 with the extendable arm 462 as illustrated in FIG. 60; retracting the laterally extendable floor portion 458 inside the trailer 10 as illustrated in FIGS. 60; and 6) lowering the helicopter 90 on the ground. The inverted process is used to bring back the helicopter 90 in the trailer 10 with the laterally extendable floor portion 458 sliding back in the trailer 10.

Figure 62:
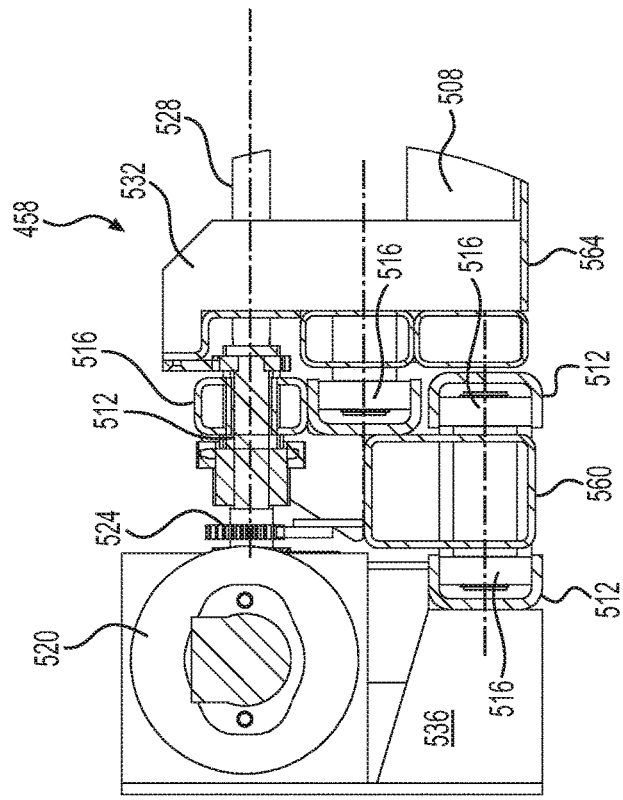
FIG. 62 is illustrating, in accordance with at least one embodiment of the invention, a partial right-side elevation section view of a portion of a trailer for transporting a helicopter therein.
Figure 63:
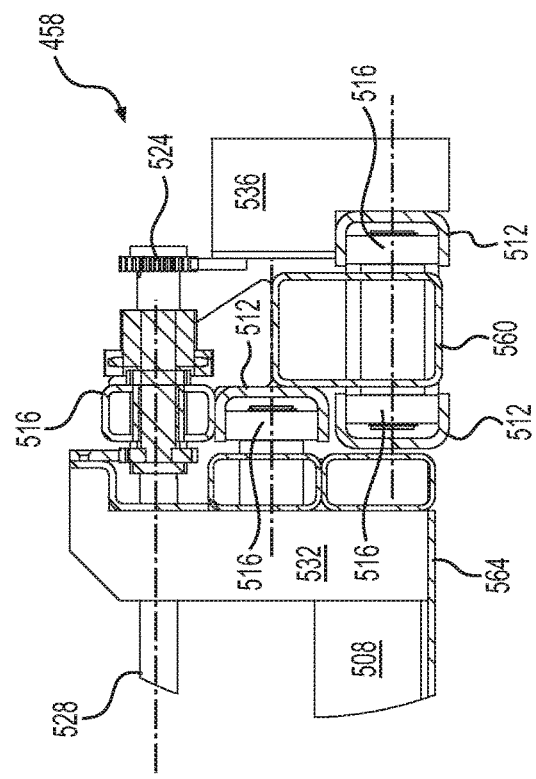
FIG. 63 is illustrating, in accordance with at least one embodiment of the invention, a partial right-side elevation section view of a portion of a trailer for transporting a helicopter therein.
Figure 64:
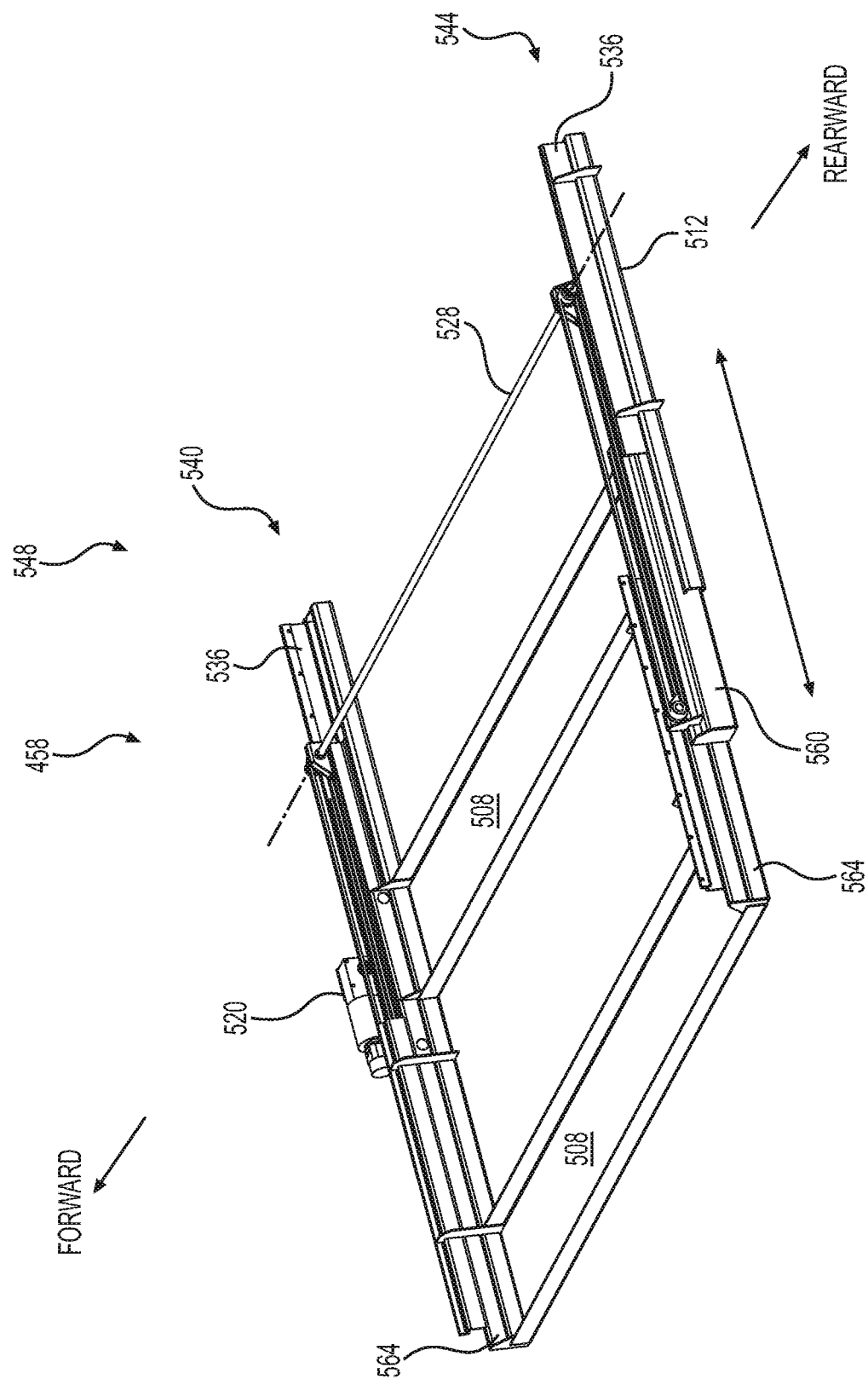
FIG. 64 is illustrating, in accordance with at least one embodiment of the invention, a rear right perspective view of a portion of a trailer for transporting a helicopter therein.
Figure 65:
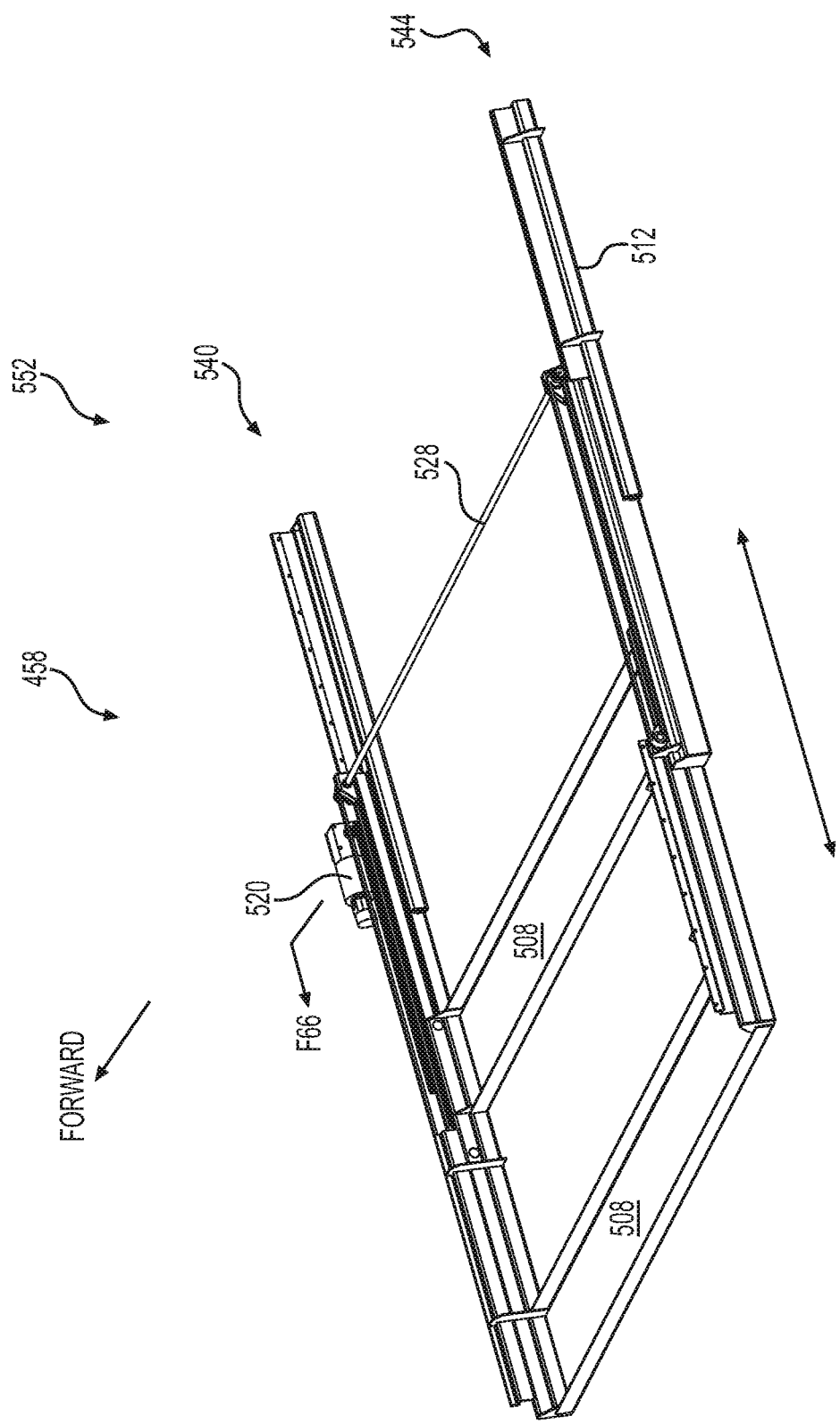
FIG. 65 is illustrating, in accordance with at least one embodiment of the invention, a rear right perspective view of a portion of a trailer for transporting a helicopter therein.
Figure 66:
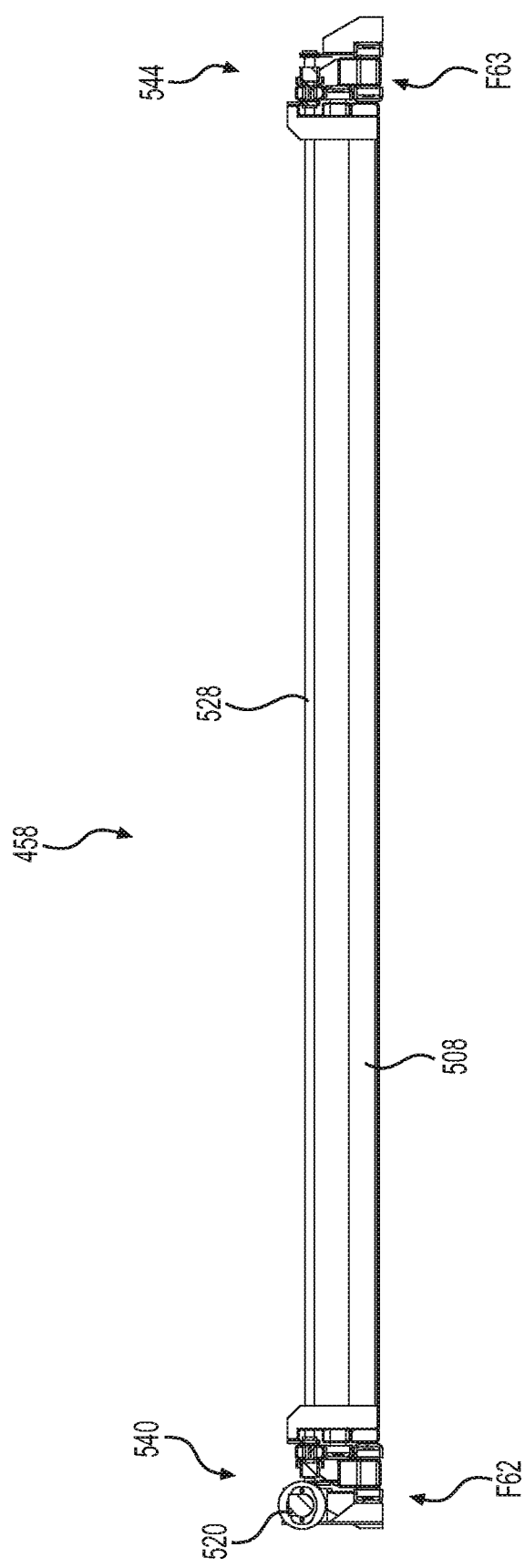
FIG. 66 is illustrating, in accordance with at least one embodiment of the invention, a right-side elevation section view of a portion of a trailer for transporting a helicopter therein.

The laterally extendable floor portion 458 mechanism includes a series of rails 512 and corresponding rollers 516 enabling a drawer-like extension mechanism actuated by a motor 520 rotating a rack and pinion mechanism 524 interconnecting both forward end 540 of the laterally extendable floor portion 458 illustrated in FIG. 62 and rearward end 544 of the laterally extendable floor portion 458 illustrated in FIG. 63. The rack and pinion mechanism 524 is interconnecting both forward and rearward ends of the laterally extendable floor portion 458 with a rotatable drive member 528 to ensure straight and synchronized movements of the laterally extendable floor portion 458. The laterally extendable floor portion 458 mechanism assembly is secured between a movable frame portion 532 and a fixed frame portion 536. A first slidable member 560 is configured to slide in respect to the fixed frame portion 536, a second slidable member 564 is configured to slide in respect to the first slidable member 560. FIG. 64 illustrates the laterally extendable floor portion 458 alone in a semi-extended configuration 548 while FIG. 65 illustrates the laterally extendable floor portion 458 in an extended configuration 552. FIG. 66 is a left elevational section view of the laterally extendable floor portion 458 for a better understanding of the assembly.

FIG. 67 is showing a portion of the frame of the trailer 10. The assembly at the location of the structural side members 450 interconnecting the low floor portion 442 to the high floor portion 446. One structural member 470 is also illustrated secured to the lower portion of the illustrated assembly.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A trailer adapted to transport a helicopter with main rotor blades operatively assembled to a main rotor of the helicopter, the trailer comprising:
    a frame supported by a set of wheels, the frame including a front-rear axis;
    a roof portion supported by the frame;
    a floor portion supported by the frame, the floor portion including
        a fixed portion; and
        a laterally movable portion disposed in front of the set of wheels for receiving thereon the helicopter outside the roof portion, in an extended configuration, and moving the helicopter in the trailer, in a retracted configuration;
        the trailer further comprising:
    a main rotor traction mechanism for applying traction on the main rotor to alleviate at least a portion of a mass of the blades attached to the main rotor of the helicopter to prevent mechanical compression to be applied to a main transmission of the helicopter when the helicopter is transported with the trailer on the road; and
    a securing element for securing and preventing relative movement between a chassis of the helicopter and the floor portion of the trailer.

2. The trailer of claim 1, further comprising a main door located on a side of the trailer, the main door including a length of at least 1290 centimeters.

3. The trailer of claim 1, further comprising a main door located on a side of the trailer, the main door including a height of at least 350 centimeters.

4. The trailer of claim 1, wherein the main rotor traction mechanism is disposed above the laterally movable floor portion of the trailer.

5. The trailer of claim 1, wherein the trailer further comprises a movable arm, the movable arm including a rotation mechanism and an extension mechanism, the movable arm having a compressed configuration and an extended configuration extending above the roof portion of the trailer.

6. The trailer of claim 1, wherein the laterally movable floor portion is superposed to a bottom frame portion.

7. The trailer of claim 6, wherein the frame portion includes a raised portion interconnected to the bottom frame portion with lateral reinforcement members.

8. The trailer of claim 1, wherein the lateral door includes two panels configured to open in a trailer interior access configuration and to close in a trailer interior closing configuration.

9. The trailer of claim 1, wherein the laterally movable floor portion further comprises a helicopter blade support.

10. The trailer of claim 1, wherein the laterally movable floor portion includes a pair of helicopter skid-receivers.

11. A helicopter crate adapted to transport a helicopter with main rotor blades operatively assembled to a main rotor of the helicopter, the helicopter crate comprising:
    a frame including a front-rear axis;
    a roof portion supported by the frame;
    a floor portion supported by the frame, the floor portion including
        a fixed portion; and
        a laterally movable portion for receiving thereon the helicopter outside the helicopter crate, in an extended configuration, and moving the helicopter in the helicopter crate, in a retracted configuration;
        the helicopter crate further comprising:
    a main rotor traction mechanism for applying traction on the main rotor to alleviate at least a portion of a mass of the blades attached to the main rotor of the helicopter to prevent mechanical compression to be applied to a main transmission of the helicopter when the helicopter is transported with the trailer on the road; and
    a securing element for securing and preventing relative movement between a chassis the helicopter and the floor portion of the helicopter crate.

12. The helicopter crate of claim 11, further comprising a main door located on a side of the helicopter crate, the main door including a length of at least 1290 centimeters.

13. The helicopter crate of claim 11, further comprising a main door located on a side of the helicopter crate, the main door including a height of at least 350 centimeters.

14. The helicopter crate of claim 11, wherein the main rotor traction mechanism is disposed above the laterally movable floor portion of the trailer.

15. The helicopter crate of claim 11, wherein the helicopter crate further comprises a movable arm, the movable arm including a rotation mechanism and an extension mechanism, the movable arm having a compressed configuration and an extended configuration extending above the roof portion of the helicopter crate.

16. The helicopter crate of claim 11, wherein the laterally movable floor portion is superposed to a bottom frame portion.

17. The helicopter crate of claim 16, wherein the frame portion includes a raised portion interconnected to the bottom frame portion with lateral reinforcement members.

18. The helicopter crate of claim 11, wherein the lateral door includes two panels configured to open in a helicopter crate interior access configuration and to close in a helicopter crate interior closing configuration.

19. The helicopter crate of claim 11, wherein the laterally movable floor portion further comprises a helicopter blade support.

20. The helicopter crate of claim 11, wherein the laterally movable floor portion includes a pair of helicopter skid-receivers.

* * * * *